US012812123B2

(12) United States Patent
Kakutani

(10) Patent No.: US 12,812,123 B2
(45) Date of Patent: Nov. 24, 2026

(54) DISPLAY SYSTEM, DISPLAY METHOD, DISPLAY CONTROLLER, AND VIDEO SIGNAL PROCESSING METHOD FOR DISPLAY CONTROLLER

(71) Applicant: Sharp Kabushiki Kaisha, Sakai City (JP)

(72) Inventor: Koichiro Kakutani, Tokyo (JP)

(73) Assignee: Sharp Kabushiki Kaisha, Sakai City (JP)

( * ) Notice: Subject to any disclaimer, the term of this patent is extended or adjusted under 35 U.S.C. 154(b) by 0 days.

(21) Appl. No.: 19/222,748

(22) Filed: May 29, 2025

(65) Prior Publication Data

US 2025/0294157 A1 Sep. 18, 2025

Related U.S. Application Data

(63) Continuation of application No. PCT/JP2023/033334, filed on Sep. 13, 2023.

(51) Int. Cl.
*H04N 19/136* (2014.01)
*G06F 3/14* (2006.01)
(Continued)

(52) U.S. Cl.
CPC ......... *H04N 19/136* (2014.11); *G06F 3/1446* (2013.01); *G06F 3/147* (2013.01); (Continued)

(58) Field of Classification Search
CPC .. H04N 19/136; H04N 19/119; H04N 19/154; H04N 19/436; G06F 3/1446; G06F 3/147
See application file for complete search history.

(56) References Cited

U.S. PATENT DOCUMENTS 6,441,870 B1 * 8/2002 Rapaich ................. H04N 5/202 348/254
8,194,997 B2 * 6/2012 Segall .................. H04N 1/6027 382/128
(Continued)

FOREIGN PATENT DOCUMENTS

JP 2007-257641 A 10/2007
JP 2010-103607 A 5/2010
(Continued)

OTHER PUBLICATIONS

International Search Report, dated Nov. 28, 2023 in International Application No. PCT/JP2023/033334 and English Translation Thereof.

*Primary Examiner* — Brian P Yenke
(74) *Attorney, Agent, or Firm* — McGinn IP Law Group, PLLC

(57) ABSTRACT

A display system includes: a first decoder that decodes a first video signal and outputs a second video signal; and an analyzer that analyzes the second video signal and acquires a luminance distribution in at least a part of an analysis range. The display system includes a first determinor that determines a first gamma curve on the basis of the luminance distribution; an encoder that outputs a third video signal obtained by encoding the second video signal using the first gamma curve; a second determinor that determines a second gamma curve on the basis of the third video signal and gamma curve information; and a second decoder that outputs a fourth video signal obtained by decoding the third video signal using the second gamma curve. The display system includes a display that displays a video on the basis of the fourth video signal.

8 Claims, 19 Drawing Sheets

(51) Int. Cl.

| | |
|---|---|
| ***G06F 3/147*** | (2006.01) |
| ***H04N 19/119*** | (2014.01) |
| ***H04N 19/154*** | (2014.01) |
| ***H04N 19/436*** | (2014.01) |

(52) U.S. Cl.

CPC ......... *H04N 19/119* (2014.11); *H04N 19/154* (2014.11); *H04N 19/436* (2014.11)

(56) References Cited

U.S. PATENT DOCUMENTS

| | | | | |
|---|---|---|---|---|
| 9,613,407 | B2 * | 4/2017 | Atkins | G06T 5/90 |
| 9,860,505 | B2 * | 1/2018 | Tsukagoshi | H04N 5/38 |
| 10,194,162 | B2 * | 1/2019 | Van Der Vleuten | H04N 19/46 |
| 10,219,007 | B2 * | 2/2019 | Francois | H04N 19/70 |
| 10,638,023 | B2 * | 4/2020 | Hamada | G09G 5/10 |
| 10,777,148 | B2 * | 9/2020 | Miyazawa | G09G 3/3426 |
| 11,315,467 | B1 * | 4/2022 | Mandle | G02B 5/201 |
| 11,336,895 | B2 * | 5/2022 | Choudhury | H04N 19/136 |
| 11,862,118 | B2 * | 1/2024 | Matsui | G09G 3/36 |
| 12,249,297 | B2 * | 3/2025 | Ramesh | G09G 3/2003 |
| 2003/0231347 | A1 * | 12/2003 | Imai | G06T 7/90 358/531 |
| 2007/0223813 | A1 | 9/2007 | Segall et al. | |
| 2008/0151108 | A1 * | 6/2008 | Doswald | H04N 7/0137 348/E7.003 |
| 2009/0161017 | A1 * | 6/2009 | Glen | H04N 21/44 348/E5.078 |
| 2014/0177730 | A1 * | 6/2014 | Chang | H04N 19/117 375/240.25 |
| 2014/0210847 | A1 * | 7/2014 | Knibbeler | G06T 5/50 345/589 |
| 2015/0117791 | A1 * | 4/2015 | Mertens | H04N 19/102 382/239 |
| 2016/0005153 | A1 * | 1/2016 | Atkins | G06T 5/90 345/591 |
| 2016/0142714 | A1 | 5/2016 | Toma et al. | |
| 2016/0165256 | A1 * | 6/2016 | Van Der Vleuten | H04N 9/68 375/240.01 |
| 2017/0039997 | A1 * | 2/2017 | An | G09G 5/10 |
| 2017/0330499 | A1 * | 11/2017 | Nakagoshi | G09G 3/36 |
| 2018/0103219 | A1 | 4/2018 | Jeong et al. | |
| 2018/0261184 | A1 * | 9/2018 | Ninan | G09G 5/005 |
| 2021/0027745 | A1 * | 1/2021 | Bai | G09G 5/10 |
| 2021/0082337 | A1 * | 3/2021 | Asamura | G09G 3/32 |
| 2021/0092461 | A1 * | 3/2021 | Gadgil | H04N 19/46 |

FOREIGN PATENT DOCUMENTS

| | | | |
|---|---|---|---|
| JP | 2017-156721 | A | 9/2017 |
| JP | 2019-109279 | A | 7/2019 |
| JP | 2019-216431 | A | 12/2019 |
| JP | 2020-533841 | A | 11/2020 |
| WO | 2019050972 | A2 | 3/2019 |

* cited by examiner

DISPLAY SYSTEM, DISPLAY METHOD, DISPLAY CONTROLLER, AND VIDEO SIGNAL PROCESSING METHOD FOR DISPLAY CONTROLLER

TECHNICAL FIELD

The present invention relates to a display system, a display method, a display controller, and a video signal processing method for a display controller.

BACKGROUND ART

Conventionally, in light emitting diode (LED) display systems, an LED controller and an LED panel are typically housed in separate housings, making it possible to cope with cases in which the installation locations of these housings are apart from each other. The LED controller and the LED panel are often connected to each other through a cable such as a local area network (LAN) cable, the transmission rate of which is usually 1 Gbps. For this reason, there is a limit to the amount of data that can be transmitted through a single cable between the LED controller and the LED panel.

In the LED display system, the high luminance characteristic of elements enables high-contrast expression, whereas degradation in image quality is perceived in low-luminance areas of a video. In the case of displays in which there is transmission between the controller and the panel, including not only the LED display system but also liquid crystal display (LCD) displays and organic light-emitting diode (OLED) displays, degradation in image quality is perceived in low-luminance areas of a video. This degradation in image quality can be prevented by increasing the amount of data (the number of bits) per pixel.

However, as described above, there is a limit to the amount of data that can be transmitted over a transmission path such as a cable, and thus an increase in the amount of data per pixel leads to a decrease in the display area of a video that can be covered by a single cable. For this reason, in order to prevent degradation in image quality by increasing the amount of data per pixel, the number of cable connections must be increased, resulting in higher product costs and reduced usability.

The following Patent Document 1 discloses a technique of performing gamma processing on an image signal generated by an imaging device followed by performing image processing thereon, performing inverse gamma processing on the image signal that has undergone the image processing, and then transmitting the image signal to a display. In this technique, gamma processing is performed to convert the image signal using characteristics represented by straight lines rather than curves for the low-luminance area as conversion characteristics. This reduces data loss in the low-luminance area, making it possible to suppress degradation in image quality in the low-luminance area without increasing the amount of data per pixel.

CITATION LIST

Patent Document

Patent Document 1: Japanese Unexamined Patent Application, First Publication No. 2017-156721

SUMMARY OF INVENTION

Technical Problem

However, the technique of Patent Document 1 takes into consideration the data loss in processing (gamma processing) performed before image processing on the image signal, but does not take into consideration the data loss in processing (inverse gamma processing) performed after image processing. Therefore, in order to suppress degradation in image quality, there is room for improvement in the processing performed after image processing on the image signal.

In view of the above problem, an object of the present invention is to provide a display system, a display method, a display controller, and a video signal processing method for a display controller that make it possible to suppress degradation in image quality caused by the data capacity of a transmission path.

Solution to Problem

In order to solve the above-described problem, according to an aspect of the present invention, there is provided a display system including: a first decoder that decodes an input first video signal and outputs a second video signal; an analyzer that analyzes the second video signal and acquires a luminance distribution in at least a part of an analysis range of the second video signal; a first determinor that determines a first gamma curve to be used for encoding the second video signal on the basis of the luminance distribution; an encoder that outputs a third video signal obtained by encoding the second video signal using the determined first gamma curve; a second determinor that determines a second gamma curve to be used for decoding the third video signal on the basis of the third video signal and gamma curve information indicating the first gamma curve used for encoding; a second decoder that outputs a fourth video signal obtained by decoding the third video signal using the determined second gamma curve; and a display that displays a video on the basis of the fourth video signal.

According to an aspect of the present invention, there is provided a display method executed by a computer, the method including: a first decoding step of decoding an input first video signal and outputting a second video signal; an analysis step of analyzing the second video signal and acquiring a luminance distribution in at least a part of an analysis range of the second video signal; a first determination step of determining a first gamma curve to be used for encoding the second video signal on the basis of the luminance distribution; an encoding step of outputting a third video signal obtained by encoding the second video signal using the determined first gamma curve; a second determination step of determining a second gamma curve to be used for decoding the third video signal on the basis of the third video signal and gamma curve information indicating the first gamma curve used for encoding; a second decoding step of outputting a fourth video signal obtained by decoding the third video signal using the determined second gamma curve; and a display step of displaying a video on the basis of the fourth video signal.

According to an aspect of the present invention, there is provided a display controller including: a decoder that decodes an input first video signal and outputs a second video signal; an analyzer that analyzes the second video signal and acquires a luminance distribution in at least a part of an analysis range of the second video signal; a determinor that determines a gamma curve to be used for encoding the second video signal on the basis of the luminance distribution; and an encoder that outputs a third video signal obtained by encoding the second video signal using the determined gamma curve.

According to an aspect of the present invention, there is provided a video signal processing method for a display controller executed by a computer, the method including: a decoding step of decoding an input first video signal and outputting a second video signal; an analysis step of analyzing the second video signal and acquiring a luminance distribution in at least a part of an analysis range of the second video signal; a determination step of determining a gamma curve to be used for encoding the second video signal on the basis of the luminance distribution; and an encoding step of outputting a third video signal obtained by encoding the second video signal using the determined gamma curve.

Advantageous Effects of Invention

According to the present invention, it is possible to suppress degradation in image quality caused by the data capacity of a transmission path.

DESCRIPTION OF EMBODIMENTS

Embodiments of the present invention will be described in detail with reference to the accompanying drawings. Hereinafter, a display system for displaying a video on a display will be described.

The display system is a system (display system) in which transmission occurs between a display (for example, a panel) of a display that displays a video and a controller of the display.

Examples of displays include a liquid crystal display (LCD) display, an organic light-emitting diode (OLED) display, a light emitting diode (LED) display, and the like.

Meanwhile, in the display system, the display and the controller may both be provided in a single housing, or may be provided in different housings. In addition, in the display system, another device such as a module may be interposed between the display and the controller. In this case, the display, the controller, and the other device may all be provided in a single housing, may be provided in different housings, or may be provided in any number of housings in any combination. That is, the configuration of the display system is not particularly limited insofar as a video signal input to the controller is transmitted before arriving at the display.

In addition, transmission between the display and the controller may be performed through wired connection in which the display and the controller are connected to each other by a cable such as a local area network (LAN) cable, or may be performed through wireless connection in which the display and the controller are connected to each other by wireless communication.

1. First Embodiment

A first embodiment will be described with reference to FIGS. 1 to 9. In the first embodiment, an example in which one video is displayed on a display having one display will be described. For example, this is a case where only one display such as an LCD display or an OLED display is used.

In addition, in the first embodiment, an example in which a display and a controller are provided in different housings, another device is interposed between the display and the controller, and the other device is provided in the same housing as the display will be described.

1-1. Configuration of Display System

Figure 1:
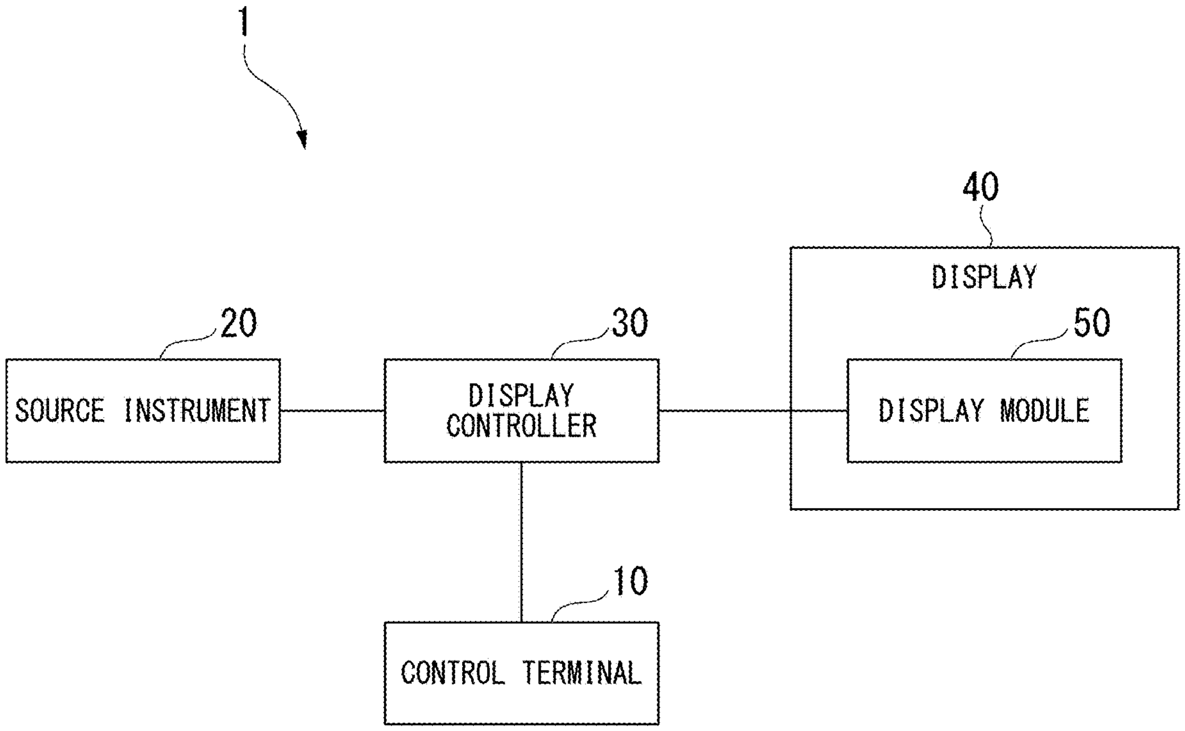
FIG. 1 A block diagram illustrating an example of a configuration of a display system according to a first embodiment.

The configuration of a display system according to the first embodiment will be described with reference to FIG. 1. FIG. 1 is a block diagram illustrating an example of the configuration of a display system according to the first embodiment.

As shown in FIG. 1, a display system 1 according to the first embodiment includes a control terminal 10, a source instrument 20, a display controller 30, a display 40, and a display module 50.

(1) Control Terminal 10

The control terminal 10 is a terminal for controlling display of a video on the display 40. The control terminal 10 is, for example, a personal computer (PC), a smartphone, a tablet terminal, or the like. The control terminal 10 is communicably connected to the display controller 30 through a wired connection or a wireless connection.

When information for controlling the display of a video is input by a user, the control terminal 10 outputs (transmits) the input information to the display controller 30.

(2) Source Instrument 20

The source instrument 20 is a device that outputs a video signal. The source instrument 20 is, for example, a PC, a video output device, or the like. The source instrument 20 is communicably connected to the display controller 30 through a wired connection or a wireless connection. The source instrument 20 and the display controller 30 are wiredly connected through a cable such as, for example, a high definition multimedia interface (HDMI) (registered trademark) cable.

The source instrument 20 outputs (transmits) a video signal to the display controller 30.

(3) Display Controller 30

The display controller 30 is a device that converts an input video signal into a video signal for displaying a video on the display 40. The display controller 30 is communicably connected to the control terminal 10, the source instrument 20, and the display 40 through a wired connection or a wireless connection.

The display controller 30 performs a process on the video signal on the basis of the information received from the control terminal 10 and the video signal received from the source instrument 20, and outputs (transmits) the processed video signal to the display 40.

(4) Display 40

The display 40 is a display device that displays a video on the basis of an input video signal. The display 40 is communicably connected to the display controller 30 through a wired connection or a wireless connection.

The display 40 displays a video on the basis of the video signal received from the display controller 30.

As shown in FIG. 1, the display 40 includes the display module 50.

(5) Display Module 50

The display module 50 incorporates a display such as a panel or a screen that constitutes a display, and a processor such as a driver or a controller that performs a process for displaying a video. The display module 50 is communicably connected to the display controller 30 through a wired connection or a wireless connection.

The display module 50 performs a process for displaying the video signal received from the display controller 30 in a processor, and displays the processed video on the display.

1-2. Functional Configuration of Display Controller

Figure 2:
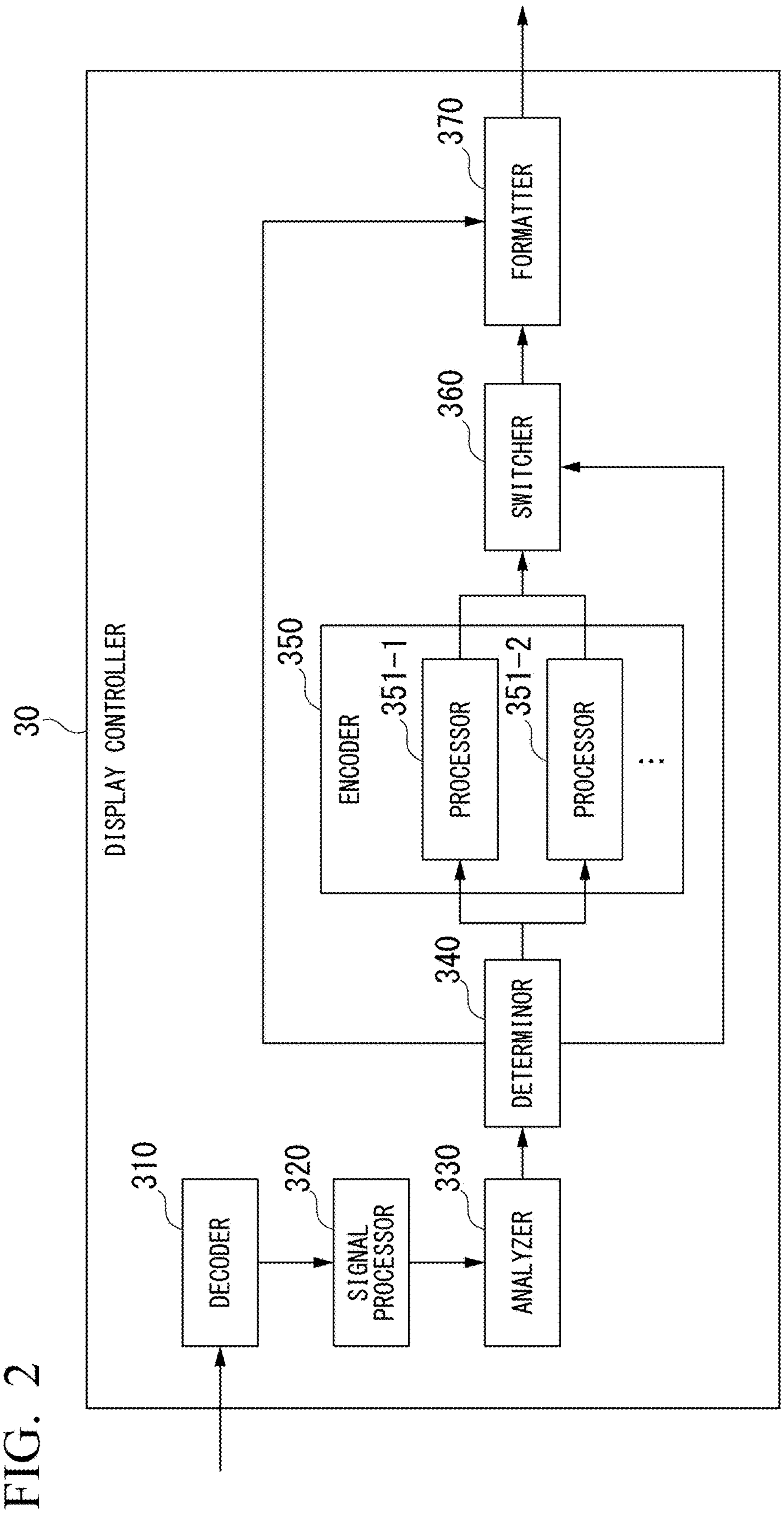
FIG. 2 A block diagram illustrating an example of a functional configuration of a display controller according to the first embodiment.

The configuration of the display system 1 according to the first embodiment has been described above. Next, the functional configuration of the display controller 30 according to the first embodiment will be described with reference to FIGS. 2 to 3. FIG. 2 is a block diagram illustrating an example of the functional configuration of the display controller 30 according to the first embodiment.

As shown in FIG. 2, the display controller 30 includes a decoder 310 (first decoder), a signal processor 320, an analyzer 330, a determinor 340 (first determinor), an encoder 350, a switcher 360, and a formatter 370.

(1) Decoder 310

The decoder 310 has a function of decoding a video signal. The decoder 310 decodes a video signal (first video signal) which is input from the source instrument 20 and outputs a video signal (second video signal).

The decoder 310 decodes the input video signal to return it to a video signal (linear data) having linear characteristics in accordance with the gamma curve of the video signal. In the decoding, the decoder 310 converts the input video signal into a video signal with a bit precision greater than the bit width of the video signal. For example, the decoder 310 converts a 10-bit video signal into a 16-bit video signal.

After the decoding, the decoder 310 outputs the video signal to the signal processor 320.

(2) Signal Processor 320

The signal processor 320 has a function of performing signal processing on a video signal. The signal processor 320 performs signal processing such as, for example, color adjustment on a video signal (second video signal) which is input from the decoder 310. In the signal processing, the bit width of the video signal may be changed. For example, the signal processor 320 may convert a 16-bit video signal which is input from the decoder 310 into a 14-bit video signal, an 18-bit video signal, or the like. The number of bits after the change is not particularly limited.

After the signal processing, the signal processor 320 outputs the video signal that has undergone the signal processing (second video signal) to the analyzer 330.

(3) Analyzer 330

The analyzer 330 has a function of analyzing a video signal. The analyzer 330 analyzes the video signal (second video signal) which is input from the signal processor 320, and acquires a luminance distribution in at least a part of an analysis range of the video signal. In the first embodiment, since one video based on the input video signal is displayed on the display 40 having one panel, the analysis range is the entire video signal (entire frame).

After the analysis, the analyzer 330 outputs the acquired luminance distribution to the determinor 340.

In the analysis, the analyzer 330 first acquires a luminance value for each pixel of the input video signal.

After the acquisition, the analyzer 330 determines the luminance level of each pixel on the basis of the acquired luminance value. Specifically, the analyzer 330 assigns each pixel to a corresponding luminance level by comparing the acquired luminance value with a reference luminance value set in advance. In this case, the analyzer 330 counts and records the number of pixels (hereinafter also referred to as the "pixel count") assigned to each luminance level.

The analyzer 330 can acquire the luminance distribution in the analysis range of the video signal by assigning luminance levels to all pixels. The luminance distribution is indicated by, for example, the number of pixels assigned to each luminance level.

The reference value is set, for example, by dividing the range of values that can be acquired by the luminance value into a plurality of regions. In the first embodiment, as an example, the range of values that can be acquired by the luminance value in a case where the number of bits is 10 bits is set to 0 to 1023, and the reference luminance value is assumed to be set by dividing this range into three regions. For example, the reference luminance value is set to 0 to 255 as a value for determining that the luminance level is level 1, 256 to 511 as a value of determining that the luminance level is level 2, and 512 to 1023 as a value of determining that the luminance level is level 3.

Meanwhile, the number of bits, the range of values that can be acquired by the luminance value, the number of regions into which the range is divided, and the value of the reference luminance value is not limited to the above-described example. For example, the number of bits is not limited to 10 bits, and the reference luminance value is set in the same way for the number of bits such as 8 bits and 12 bits.

(4) Determinor 340

The determinor 340 has a function of determining a gamma curve to be used for encoding a video signal. The determinor 340 determines a gamma curve (first gamma curve) to be used for encoding a video signal (second video signal) on the basis of the luminance distribution acquired by the analyzer 330.

After the determination, the determinor 340 outputs the video signal to the encoder 350, and outputs gamma curve information to the switcher 360 and the formatter 370. The gamma curve information to be output here is information indicating the gamma curve determined by the determinor 340 to be used for encoding the video signal.

As the gamma curves to be used for encoding, gamma curves of types according to the proportion of pixels with low luminance in the analysis range are prepared. For example, in the first embodiment, three types of gamma curves are prepared for encoding.

The first type is a gamma curve for encoding used for encoding in a case where the proportion of pixels with low luminance in the analysis range is high (that is, the number of pixels of level 1 is large). The second type is a gamma curve for encoding used for encoding in a case where the proportion of pixels with low luminance in the analysis range is medium (that is, the number of pixels of level 2 is large). The third type is a gamma curve for encoding used for encoding in a case where the proportion of pixels with low luminance in the analysis range is low (that is, the number of pixels of level 3 is large).

Figure 3:
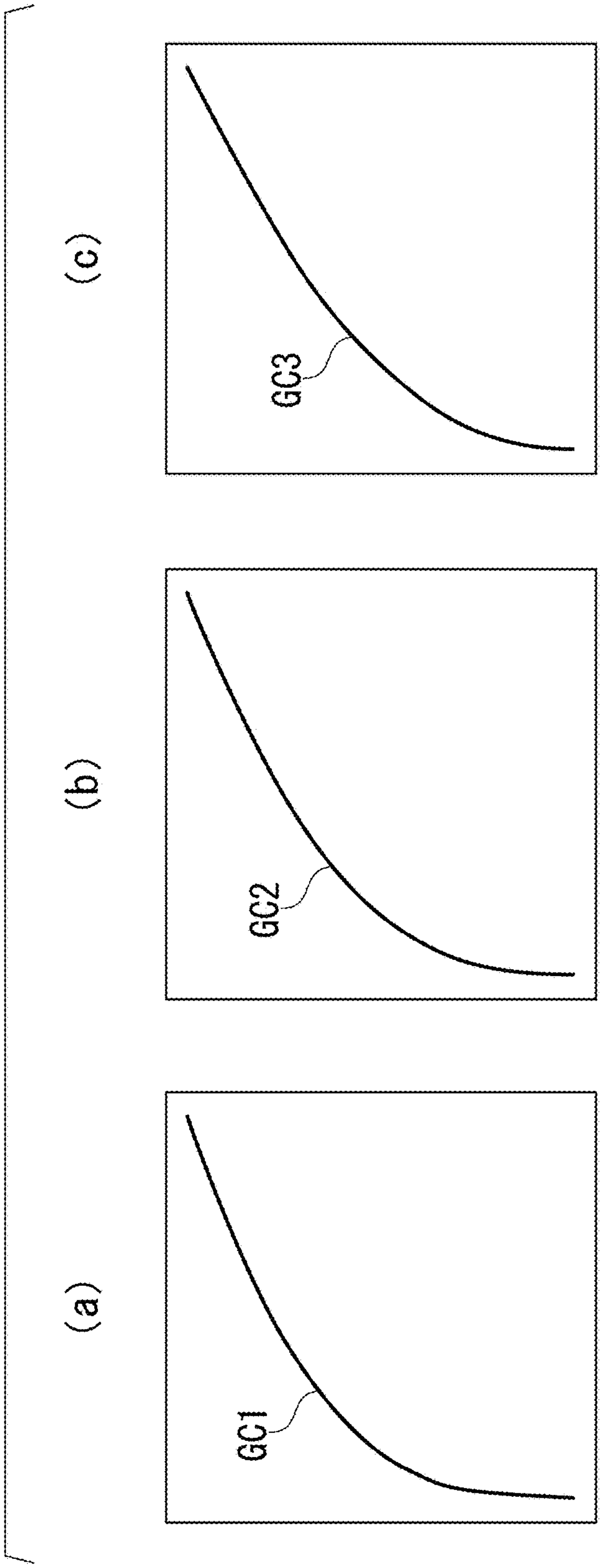
FIG. 3 A diagram illustrating an example of gamma curves to be used for encoding a video signal according to the first embodiment.

Here, a gamma curve to be used for encoding a video signal will be described with reference to FIG. 3. FIG. 3 is a diagram illustrating an example of gamma curves to be used for encoding a video signal according to the first embodiment.

A gamma curve GC1 indicated by the graph (a) shown in FIG. 3 is a gamma curve for encoding that corresponds to level 1. The gamma value of the gamma curve GC1 is set to be smaller than those of the other gamma curves.

A gamma curve GC2 indicated by the graph (b) shown in FIG. 3 is a gamma curve for encoding that corresponds to level 2. The gamma value of the gamma curve GC2 is set to be larger than that of the gamma curve GC1 and smaller than that of a gamma curve GC3.

The gamma curve GC3 indicated by the graph (c) shown in FIG. 3 is a gamma curve for encoding that corresponds to level 3. The gamma value of the gamma curve GC3 is set to be larger than those of the other gamma curves.

The determinor 340 determines a gamma curve to be used for encoding a video signal in accordance with the proportion of pixels with low luminance in the analysis range from the acquired luminance distribution. The determinor 340 determines the proportion of pixels with low luminance in the analysis range by comparing the number of pixels at each luminance level indicated by the acquired luminance distribution with the reference number of pixels (hereinafter also referred to as the "reference pixel count").

For example, in the first embodiment, in a case where the number of pixels of which the luminance level is either level 1 or level 2 is equal to or greater than the reference number of pixels, and the number of pixels of level 1 is equal to or greater than the number of pixels of level 2, the determinor 340 determines that the proportion of pixels with low luminance in the analysis range is high.

In addition, in a case where the number of pixels of which the luminance level is either level 1 or level 2 is equal to or greater than the reference number of pixels, and the number of pixels of level 1 is less than the number of pixels of level 2, the determinor 340 determines that the proportion of pixels with low luminance in the analysis range is medium.

In addition, in a case where the number of pixels of which the luminance level is either level 1 or level 2 is less than the reference number of pixels, the determinor 340 determines that the proportion of pixels with low luminance in the analysis range is low.

In a case where the proportion of pixels with low luminance in the analysis range is high, the determinor 340 determines to use a gamma curve (the gamma curve GC1 in FIG. 3) in which the gamma value is set to be smaller than in a case where the proportion of pixels with luminance other than low luminance in the analysis range is high.

In addition, in a case where the proportion of pixels with low luminance in the analysis range is medium, the determinor 340 determines to use a gamma curve (the gamma curve GC2 in FIG. 3) in which the gamma value is set to be larger than in a case where the proportion of pixels with low luminance in the analysis range is high, and gamma value is set to be smaller than in a case where the proportion of pixels with low luminance in the analysis range is low.

In addition, in a case where the proportion of pixels with low luminance in the analysis range is low, the determinor 340 determines to use a gamma curve (the gamma curve GC3 in FIG. 3) in which the gamma value is set to be larger than in a case where the proportion of pixels with low luminance in the analysis range is medium.

(5) Encoder 350

The encoder 350 has a function of encoding a video signal. The encoder 350 outputs a video signal (third video signal) obtained by encoding the video signal (second video signal) which is input from the determinor 340 using the gamma curve (first gamma curve) determined by the determinor 340. In the encoding, the encoder 350 converts the input video signal into a video signal with a bit precision smaller than the bit width of the video signal. For example, the encoder 350 converts a 16-bit video signal into a 10-bit video signal.

After the encoding, the encoder 350 outputs the video signal to the switcher 360.

Meanwhile, in the first embodiment, encoding is performed in parallel using not only the gamma curve determined by the determinor 340, but also other prepared gamma curves. Therefore, as shown in FIG. 2, the encoder 350 includes a plurality of processors 351. The plurality of processors 351 are prepared, for example, in the same number as the number of gamma curves to be used for encoding.

In the encoder 350, encoding is performed on the same video signal using a different gamma curve for each of the plurality of processors 351-1, 351-2, . . . . In the case of the first embodiment, three gamma curves GC1 to GC3 are prepared, and thus three processors 351 are prepared. In the first processor 351, encoding is performed using the gamma curve GC1. In the second processor 351, encoding is performed using the gamma curve GC2. In the third processor 351, encoding is performed using the gamma curve GC3.

(6) Switcher 360

The switcher 360 has a function of performing switching between a plurality of video signals. The switcher 360 switches which of the plurality of video signals output from each of the processors 351 of the encoder 350 is to be output to a block in the subsequent stage on the basis of the gamma curve information which is input from the determinor 340.

After the switching, the switcher 360 outputs the video signal to the formatter 370.

For example, in the first embodiment, in a case where the gamma curve information indicates the gamma curve GC1, the switcher 360 switches so as to output a video signal encoded using the gamma curve GC1.

In a case where the gamma curve information indicates the gamma curve GC2, the switcher 360 switches so as to output a video signal encoded using the gamma curve GC2.

In a case where the gamma curve information indicates the gamma curve GC3, the switcher 360 switches so as to output a video signal encoded using the gamma curve GC3.

(7) Formatter 370

The formatter 370 has a function of processing the video signal in accordance with the format of the transmission path between the display controller 30 and the display module 50. The formatter 370 processes the video signal which is input from the switcher 360 in accordance with the format of the transmission path. Further, the formatter 370 performs a process of embedding the gamma curve information which is input from the determinor 340 into the video signal which is input from the switcher 360 in order to transmit information on the gamma curve used for encoding the output video signal to the display module 50.

After the processing, the formatter 370 outputs the video signal to the display module 50.

1-3. Functional Configuration of Display Module

Figure 4:
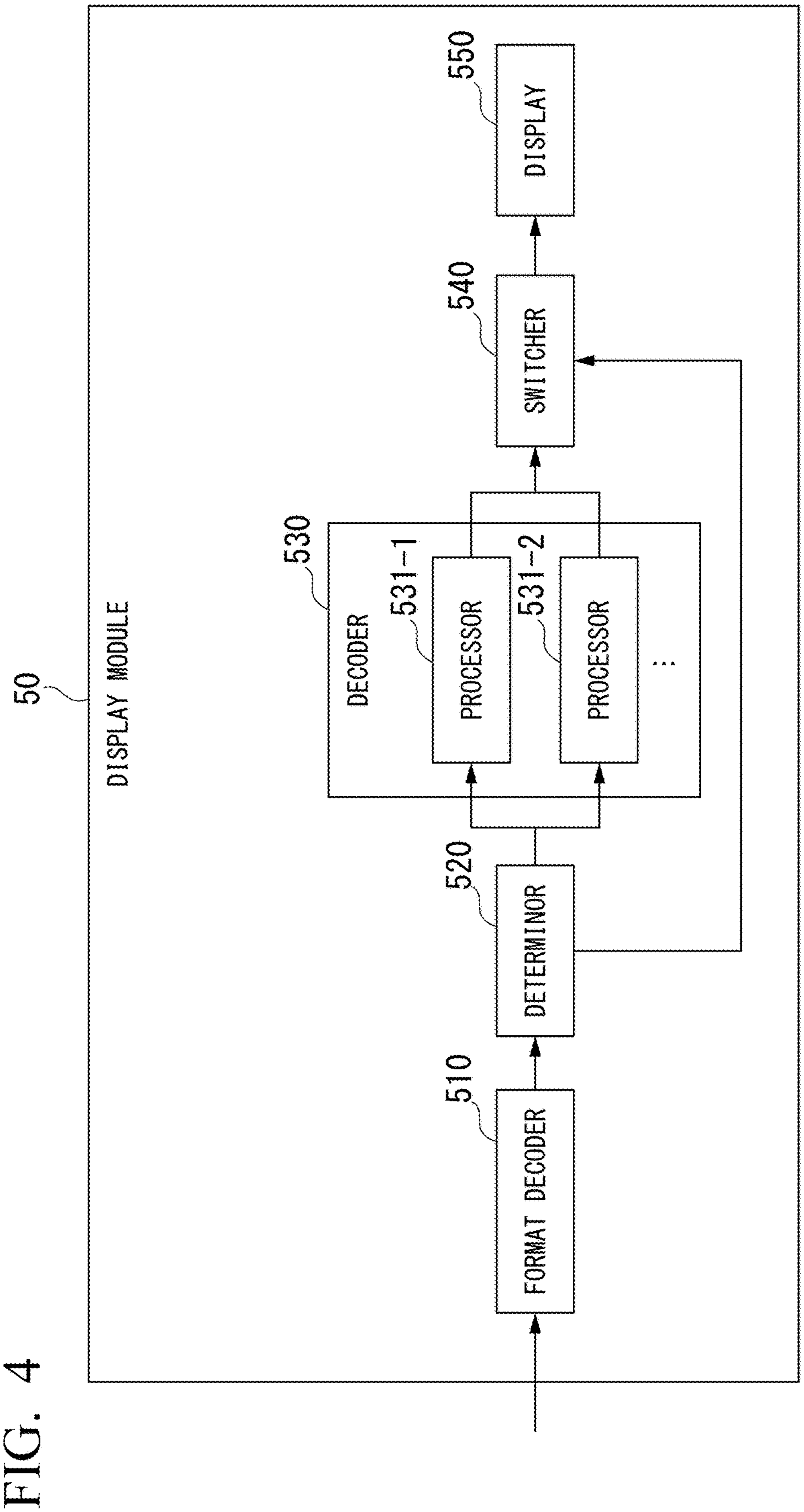
FIG. 4 A block diagram illustrating an example of a functional configuration of a display module according to the first embodiment.

The functional configuration of the display controller 30 according to the first embodiment has been described above. Next, the functional configuration of the display module 50 according to the first embodiment will be described with reference to FIGS. 4 to 5. FIG. 4 is a block diagram illustrating an example of the functional configuration of the display module 50 according to the first embodiment.

As shown in FIG. 4, the display module 50 includes a format decoder 510, a determinor 520 (second determinor), a decoder 530 (second decoder), a switcher 540, and a display 550.

(1) Format Decoder 510

The format decoder 510 has a function of decoding the format of a video signal. The format decoder 510 decodes the format of a video signal (third video signal) which is input from the display controller 30. Thereby, the format decoder 510 acquires the video signal and gamma curve information indicating the gamma curve (first gamma curve) used for encoding the video signal.

After the format is decoded, the format decoder 510 outputs the video signal and the gamma curve information to the determinor 520.

(2) Determinor 520

The determinor 520 has a function of determining a gamma curve to be used for decoding a video signal. The determinor 520 determines a gamma curve (second gamma curve) to be used for decoding a video signal on the basis of the video signal (third video signal) acquired by the format decoder 510 and the gamma curve information.

After the determination, the determinor 520 outputs the video signal to the decoder 530, and outputs the gamma curve information to the switcher 540. The gamma curve information to be output here is the gamma curve information input from the format decoder 510.

The gamma curves used for decoding are prepared to correspond to the types of gamma curves used for encoding in the display controller 30. For example, in the first embodiment, three types of gamma curves are prepared for decoding.

The first type is a gamma curve for decoding that corresponds to a gamma curve used for encoding in a case where the proportion of pixels with low luminance in the analysis range is high (that is, the number of pixels of level 1 is large). The second type is a gamma curve for decoding that corresponds to a gamma curve used for encoding in a case where the proportion of pixels with low luminance in the analysis range is medium (that is, the number of pixels of level 2 is large). The third type is a gamma curve for decoding that corresponds to a gamma curve used for encoding in a case where the proportion of pixels with low luminance in the analysis range is low (that is, the number of pixels of level 3 is large).

Figure 5:
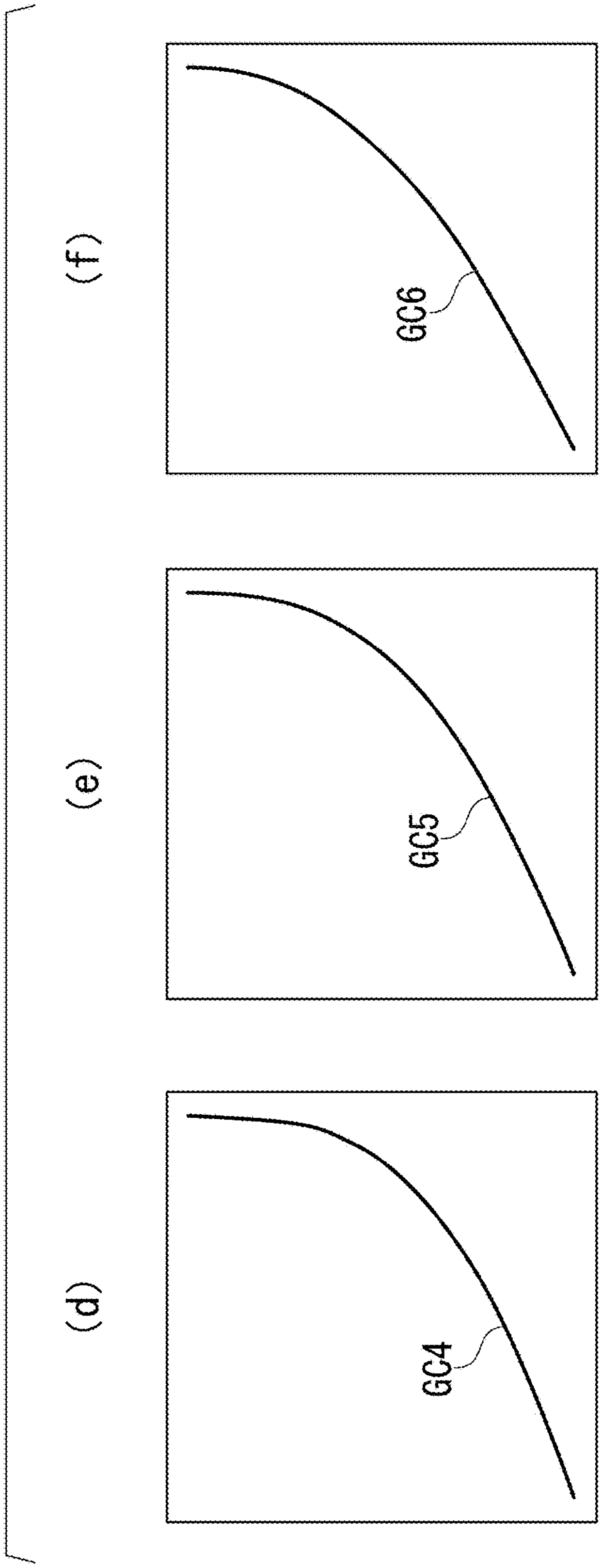
FIG. 5 A diagram illustrating an example of gamma curves to be used for decoding a video signal according to the first embodiment.

Here, gamma curves to be used for decoding a video signal will be described with reference to FIG. 5. FIG. 5 is a diagram illustrating an example of gamma curves to be used for decoding a video signal according to the first embodiment.

A gamma curve GC4 indicated by the graph (d) shown in FIG. 5 is a gamma curve for decoding that corresponds to level 1. The gamma value of the gamma curve GC4 is set to be larger than those of the other gamma curves for decoding.

A gamma curve GC5 indicated by the graph (e) shown in FIG. 5 is a gamma curve for decoding that corresponds to level 2. The gamma value of the gamma curve GC5 is set to be smaller than that of the gamma curve GC4, and larger than that of a gamma curve GC6.

The gamma curve GC6 indicated by the graph (f) shown in FIG. 5 is a gamma curve for decoding that corresponds to level 3. The gamma value of the gamma curve GC6 is set to be smaller than those of the other gamma curves for decoding.

Based on a gamma value (first gamma value) set in the gamma curve indicated by the acquired gamma curve information, the determinor 520 determines to use a gamma curve in which a gamma value (second gamma value) which is the reciprocal of the gamma value is set.

For example, in the first embodiment, in a case where the gamma value indicated by the gamma curve information is that of the gamma curve GC1, the determinor 520 determines that the gamma curve GC4 having a gamma value which is the reciprocal of the gamma value is to be used for decoding.

In addition, in a case where the gamma value indicated by the gamma curve information is that of the gamma curve GC2, the determinor 520 determines that the gamma curve GC5 having a gamma value which is the reciprocal of the gamma value is to be used for decoding.

In addition, in a case where the gamma value indicated by the gamma curve information is that of the gamma curve GC3, the determinor 520 determines that the gamma curve GC6 having a gamma value which is the reciprocal of the gamma value is to be used for decoding.

(3) Decoder 530

The decoder 530 has a function of decoding a video signal. The decoder 530 outputs a video signal (fourth video signal) obtained by decoding the video signal (third video signal) which is input from the determinor 520 using the gamma curve (second gamma curve) determined by the determinor 520.

After the decoding, the decoder 530 outputs the video signal to the switcher 540.

Meanwhile, in the first embodiment, decoding is performed in parallel using not only the gamma curve determined by the determinor 520, but also other prepared gamma curves. Therefore, as shown in FIG. 4, the decoder 530 includes a plurality of processors 531. The plurality of processors 531 are prepared, for example, in the same number as the number of gamma curves to be used for decoding.

In the decoder 530, decoding is performed on the same video signal using a different gamma curve for each of the plurality of processors 531-1, 531-2, . . . . In the case of the first embodiment, three gamma curves GC4 to GC6 are prepared, and thus three processors 351 are prepared. In the first processor 351, decoding is performed using the gamma curve GC4. In the second processor 351, decoding is performed using the gamma curve GC5. In the third processor 351, decoding is performed using the gamma curve GC6.

(4) Switcher 540

The switcher 540 has a function of performing switching between a plurality of video signals. The switcher 540 switches which of the plurality of video signals (fourth video signal) output from each of the processors 531 of the decoder 530 is to be output to a block in the subsequent stage on the basis of the gamma curve information which is input from the determinor 520.

After the switching, the switcher 540 outputs the video signal to the display 550.

For example, in the first embodiment, in a case where the gamma curve information indicates that the gamma curve GC1 has been used for encoding in the display controller 30, the switcher 540 switches so as to output a video signal decoded using the gamma curve GC4.

In a case where the gamma curve information indicates that the gamma curve GC2 has been used for encoding in the display controller 30, the switcher 540 switches so as to output a video signal decoded using the gamma curve GC5.

In a case where the gamma curve information indicates that the gamma curve GC3 has been used for encoding in the display controller 30, the switcher 540 switches so as to output a video signal encoded using the gamma curve GC6.

(5) Display 550

The display 550 has a function of displaying a video. The display 550 displays a video on the basis of the video signal (fourth video signal) which is input from the switcher 540.

1-4. Flow of Processing

The functional configuration of the display module 50 according to the first embodiment has been described above. Next, a flow of processing according to the first embodiment will be described with reference to FIGS. 6 to 7.

(1) Flow of Processing in Display System 1

Figure 6:
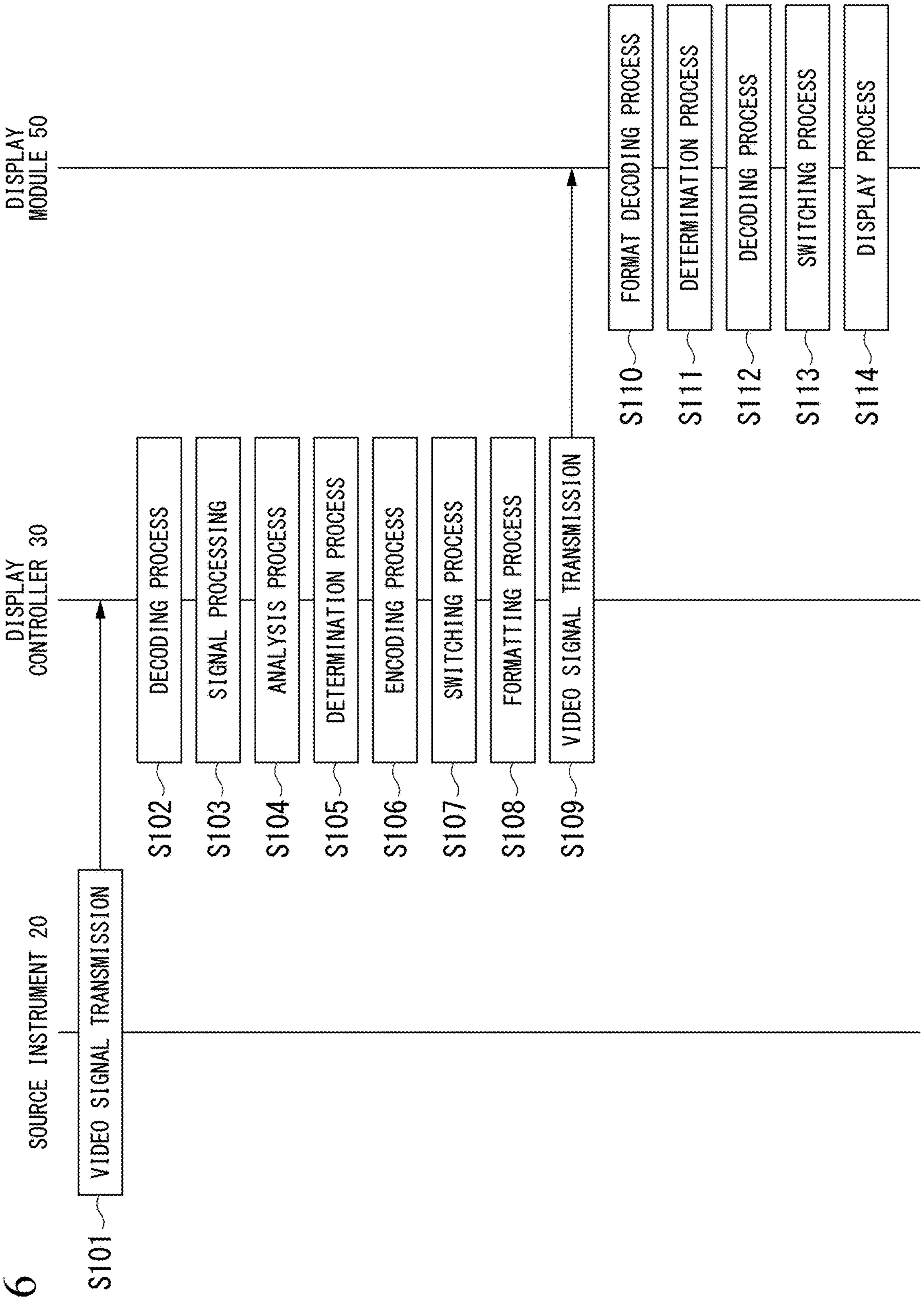
FIG. 6 A sequence diagram illustrating an example of a flow of processing in the display system according to the first embodiment.

A flow of processing in the display system 1 will be described with reference to FIG. 6. FIG. 6 is a sequence diagram illustrating an example of a flow of processing in the display system 1 according to the first embodiment. The processing shown in FIG. 6 is executed, for example, when an operation for displaying a video on the display 40 is performed on the control terminal 10 as a trigger.

As shown in FIG. 6, first, the source instrument 20 transmits a video signal to the display controller 30 (step S101).

The decoder 310 of the display controller 30 performs a decoding process when a video signal is input from the source instrument 20 (step S102). In the decoding process, the decoder 310 performs decoding on the video signal input from the source instrument 20, and outputs the decoded video signal.

Next, the signal processor 320 of the display controller 30 performs signal processing (step S103). In the signal processing, the signal processor 320 performs color adjustment or the like on the video signal input from the decoder 310, and outputs the processed video signal.

Next, the analyzer 330 of the display controller 30 performs an analysis process (step S104). In the analysis process, the analyzer 330 analyzes the video signal input from the signal processor 320, and acquires and outputs the luminance distribution of the video signal.

Next, the determinor 340 of the display controller 30 performs a determination process (step S105). In the determination process, the determinor 340 determines a gamma curve to be used for encoding a video signal on the basis of the luminance distribution which is input from the analyzer 330, and outputs the video signal and the gamma curve information.

Next, the encoder 350 of the display controller 30 performs an encoding process (step S106). In the encoding process, the encoder 350 performs encoding using different gamma curves in each processor 351 on the video signal which is input from the determinor 340, and outputs a plurality of encoded video signals.

Next, the switcher 360 of the display controller 30 performs a switching process (step S107). In the switching process, the switcher 360 performs switching on a video signal to be output to a block in the subsequent stage among the plurality of video signals output from each processor 351 of the encoder 350 on the basis of the gamma curve information which is input from the determinor 340, and outputs one video signal.

Next, the formatter 370 of the display controller 30 performs a formatting process (step S108). In the formatting process, the formatter 370 processes the video signal which is input from the switcher 360 and embeds the gamma curve information which is input from the determinor 340 into the video signal.

Next, the formatter 370 transmits the video signal that has undergone the formatting process to the display module 50 (step S109).

The format decoder 510 of the display module 50 performs a format decoding process when a video signal is input from the display controller 30 (step S110). In the format decoding process, the format decoder 510 decodes the format of the video signal which is input from the display controller 30, and acquires and outputs the video signal and the gamma curve information.

Next, the determinor 520 of the display module 50 performs a determination process (step S111). In the determination process, the determinor 520 determines a gamma curve to be used for decoding a video signal on the basis of the video signal and the gamma curve information which are input from the format decoder 510, and outputs the video signal and the gamma curve information.

Next, the decoder 530 of the display module 50 performs a decoding process (step S112). In the decoding process, the decoder 530 performs decoding using different gamma curves in each processor 531 on the video signal which is input from the determinor 520, and outputs a plurality of decoded video signals.

Next, the switcher 540 of the display module 50 performs a switching process (step S113). In the switching process, the switcher 540 performs switching on a video signal to be output to a block in the subsequent stage among the plurality of video signals output from each processor 531 of the decoder 530 on the basis of the gamma curve information which is input from the determinor 520, and outputs one video signal.

Next, the display 550 of the display module 50 performs a display process (step S114). In the display process, the display 550 displays a video on the basis of the video signal which is input from the switcher 540.

(2) Detailed Flow of Analysis Process and Determination Process

Figure 7:
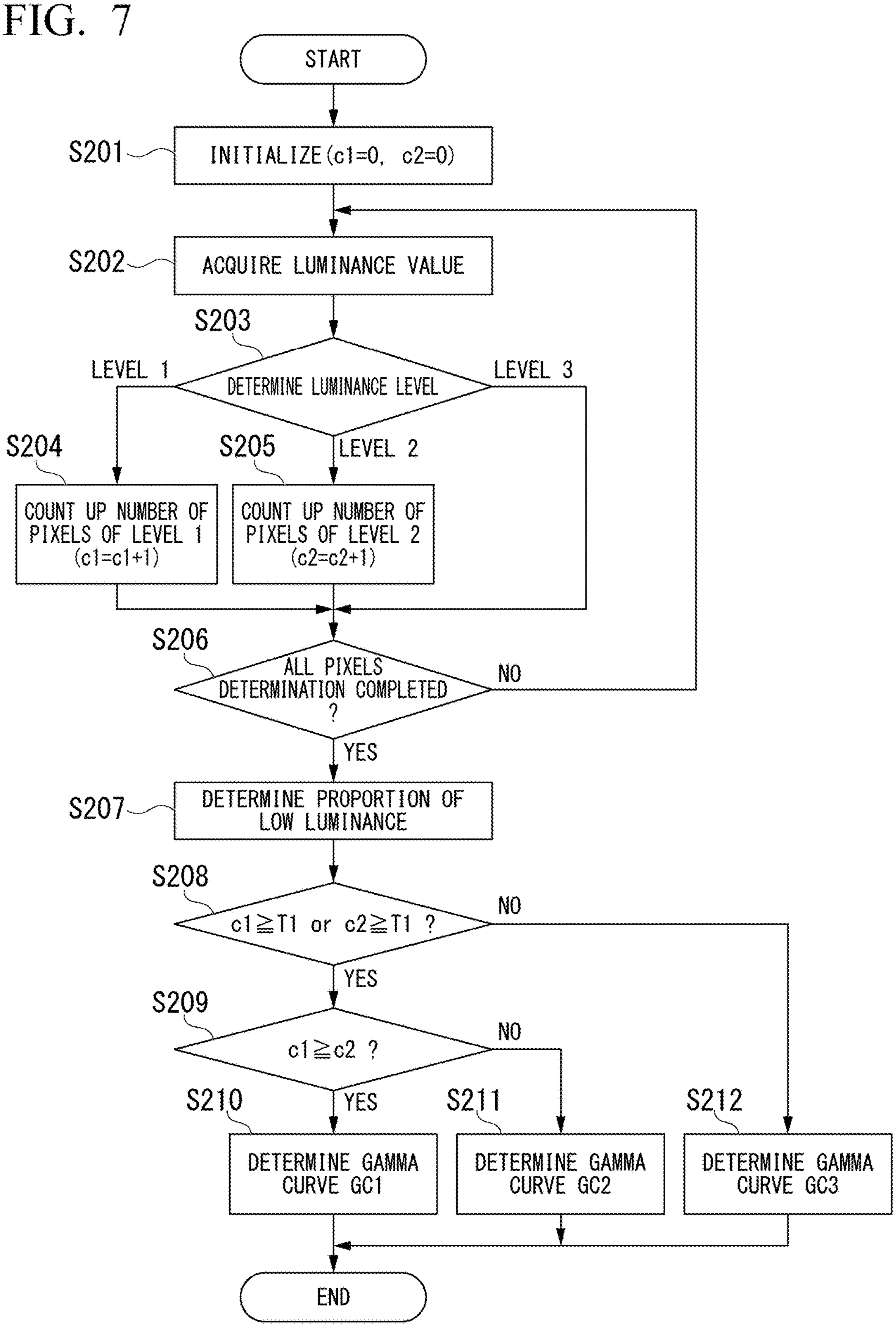
FIG. 7 A flowchart illustrating an example of a detailed flow of an analysis process and a determination process according to the first embodiment.

A detailed flow of the analysis process and the determination process will be described with reference to FIG. 7. FIG. 7 is a flowchart illustrating an example of a detailed flow of the analysis process and the determination process according to the first embodiment. Meanwhile, in the processing shown in FIG. 7, the luminance level of pixels with a luminance value of 0 to 255 is determined as level 1, the luminance level of pixels with a luminance value of 256 to 511 is determined as level 2, and the luminance level of pixels with a luminance value of 512 to 1023 is determined as level 3. In addition, the number of pixels of which the luminance level is level 1 is denoted as c1, the number of pixels of which the luminance level is level 2 is denoted as c2, and the reference number of pixels is denoted as T1.

As shown in FIG. 7, first, the analyzer 330 of the display controller 30 performs initialization (step S201). In the initialization, the analyzer 330 sets c1=0 and c2=0.

Next, the analyzer 330 acquires a luminance value for each pixel of the video signal which is input from the signal processor 320 (step S202).

Next, the analyzer 330 determines the luminance level for each pixel of the video signal on the basis of the acquired luminance value for each pixel (step S203).

In a case where the luminance level is level 1 (step S203/level 1), the analyzer 330 counts up the number of pixels c1 of level 1 (c1=c1+1) (step S204). After counting up, the process proceeds to step S206. In a case where the luminance level is level 2 (step S203/level 2), the analyzer 330 counts up the number of pixels c2 of level 2 (c2=c2+1) (step S205). After counting up, the process proceeds to step S206. In a case where the luminance level is level 3 (step S203/level 3), the analyzer 330 advances the process to step S206.

In a case where the process proceeds to step S206, the analyzer 330 determines whether the determination of the luminance levels for all pixels has been completed (step S206). In a case where the determination has been completed (step S206/YES), the process proceeds to step S207. On the other hand, in a case where the determination has not been completed (step S206/NO), the process is repeated from step S202.

In a case where the process proceeds to step S207, the determinor 340 of the display controller 30 determines the proportion of pixels with low luminance in the analysis range of the video signal (step S207).

Specifically, first, the determinor 340 determines whether either the number of pixels c1 of which the luminance level is level 1 or the number of pixels c2 of which the luminance level is level 2 is equal to or greater than the reference number of pixels T1 (c1≥T1 or c2≥T1) (step S208). In a case where either c1 or c2 is equal to or greater than T1 (step S208/YES), the process proceeds to step S209. On the other hand, in a case where both c1 and c2 are less than T1 (step S208/NO), the process proceeds to step S212.

In a case where the process proceeds to step S209, the determinor 340 determines whether the number of pixels c1 of which the luminance level is level 1 is equal to or greater than the number of pixels c2 of which the luminance level is level 2 (c1≥c2) (step S209). In a case where c1 is equal to or greater than c2 (step S209/YES), the process proceeds to step S210. On the other hand, in a case where c1 is less than c2 (step S209/NO), the process proceeds to step S211.

In a case where the process proceeds to step S210, the determinor 340 determines that the proportion of pixels with low luminance in the analysis range of the video signal is high, and determines to use the gamma curve GC1 (step S210).

In a case where the process proceeds to step S211, the determinor 340 determines that the proportion of pixels with low luminance in the analysis range of the video signal is medium, and determines to use the gamma curve GC2 (step S211).

In a case where the process proceeds to step S212, the determinor 340 determines that the proportion of pixels with low luminance in the analysis range of the video signal is low, and determines to use the gamma curve GC3 (step S212).

After the gamma curve is determined, the processing shown in FIG. 7 is completed.

1-5. Modification Example

The flow of processing according to the first embodiment has been described above. Next, a modification example according to the first embodiment will be described.

The above-described first embodiment involves the description of an example in which the proportion of pixels with low luminance in a video signal is determined on the basis of the number of pixels of each luminance level, and a gamma curve to be used for encoding is determined, but is not limited to such an example. For example, the determination of the gamma curve to be used for encoding may be performed by determining the proportion of pixels with low luminance in a video signal on the basis of the area of each luminance level in a histogram.

Figure 8:
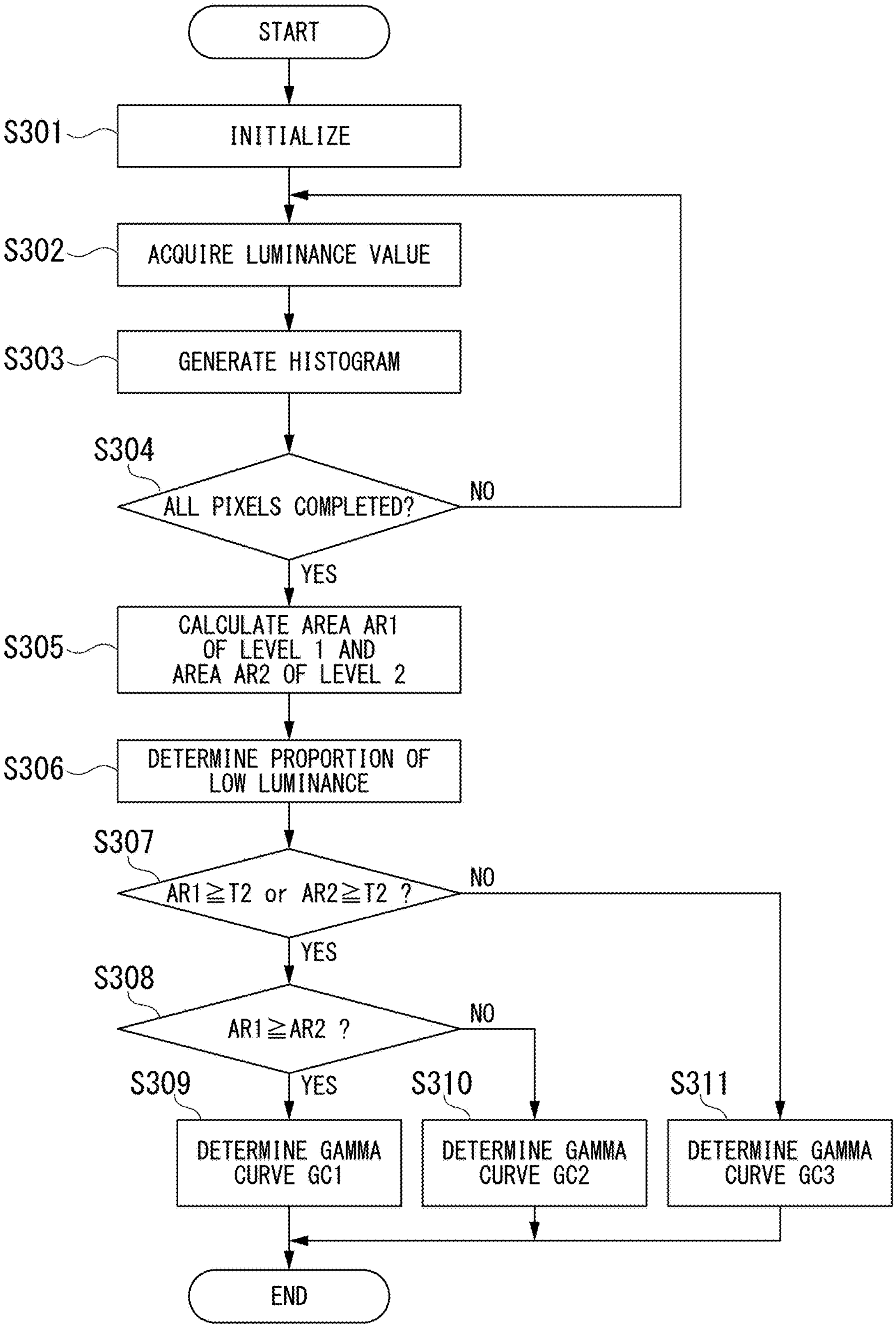
FIG. 8 A flowchart illustrating an example of a detailed flow of an analysis process and a determination process in a modification example according to the first embodiment.

Here, reference will be made to FIGS. 8 and 9 to describe a flow of processing in a case where the proportion of pixels with low luminance in a video signal is determined on the basis of the area of each luminance level in a histogram, and a gamma curve to be used for encoding is determined. FIG. 8 is a flowchart illustrating an example of a detailed flow of the analysis process and the determination process in the modification example according to the first embodiment. Meanwhile, in the processing shown in FIG. 8, the area in the histogram where the luminance level is level 1 is denoted as AR1, and the area where the luminance level is level 2 is denoted as AR2, and the reference area is denoted as T2.

Figure 9:
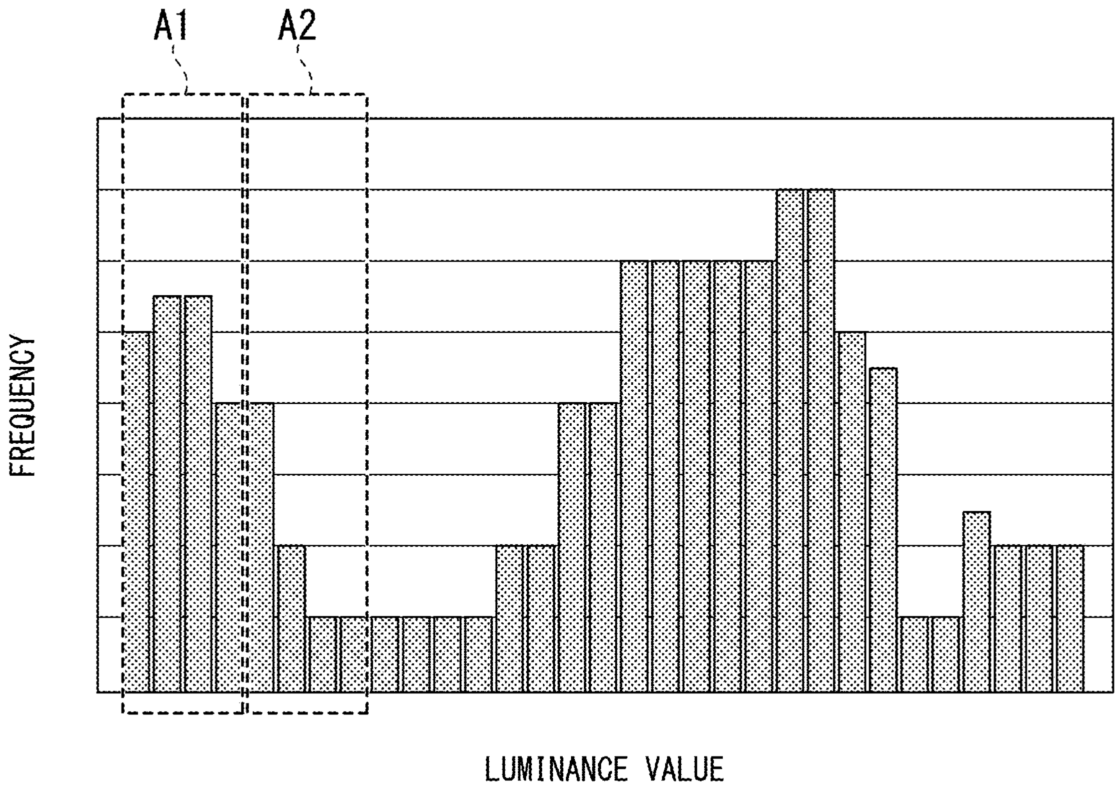
FIG. 9 A diagram illustrating an example of a histogram in the modification example according to the first embodiment.

FIG. 9 is a diagram illustrating an example of a histogram in the modification example according to the first embodiment. The horizontal axis of the histogram shown in FIG. 9 represents a luminance value, and the vertical axis represents a frequency. In addition, a region A1 shown in FIG. 9 is a region including a histogram of pixels of which the luminance level is level 1, and a region A2 is a region including a histogram of pixels of which the luminance level is level 2.

As shown in FIG. 8, first, the analyzer 330 of the display controller 30 performs initialization (step S301). In the initialization, the analyzer 330 resets the determination result of the previous frame.

Next, the analyzer 330 acquires a luminance value for each pixel of the video signal which is input from the signal processor 320 (step S302).

Next, the analyzer 330 generates a histogram on the basis of the acquired luminance value for each pixel (step S303). The analyzer 330 generates, for example, a histogram as shown in FIG. 9.

Next, the analyzer 330 determines whether the generation of histograms for all pixels has been completed (step S304). In a case where the determination has been completed (step S304/YES), the process proceeds to step S305. On the other hand, in a case where the determination has not been completed (step S304/NO), the process is repeated from step S302.

In a case where the process proceeds to step S305, the determinor 340 of the display controller 30 calculates an area AR1 where the luminance level is level 1 and an area AR2 where the luminance level is level 2 in the histogram generated by the analyzer 330 (step S305). In a case where the analyzer 330 generates the histogram shown in FIG. 9, the determinor 340 calculates the area of the histogram within the region A1 as the area AR1 where the luminance level is level 1, and calculates the area of the histogram within the region A2 as the area AR2 where the luminance level is level 2.

Next, the determinor 340 determines the proportion of pixels with low luminance in the analysis range of the video signal (step S306).

Specifically, first, the determinor 34 determines whether either the area AR1 where the luminance level is level 1 or the area AR2 where the luminance level is level 2 is equal to or greater than the reference area T2 (AR1≥T2 or AR2≥T2) (step S307). In a case where either AR1 or AR2 is equal to or greater than T2 (step S307/YES), the process proceeds to step S308. On the other hand, in a case where both AR1 and AR2 are less than T2 (step S307/NO), the process proceeds to step S311.

In a case where the process proceeds to step S308, the determinor 340 determines whether the area AR1 where the luminance level is level 1 is equal to or greater than the area AR2 where the luminance level is level 2 (AR1≥AR2) (step S308). In a case where AR1 is equal to or greater than AR2 (step S308/YES), the process proceeds to step S309. On the other hand, in a case where AR1 is less than AR2 (step S308/NO), the process proceeds to step S310.

In a case where the process proceeds to step S309, the determinor 340 determines that the proportion of pixels with low luminance in the analysis range of the video signal is high, and determines to use the gamma curve GC1 (step S309).

In a case where the process proceeds to step S310, the determinor 340 determines the proportion of pixels with low luminance in the analysis range of the video signal is medium, and determines to use the gamma curve GC2 (step S310).

In a case where the process proceeds to step S311, the determinor 340 determines the proportion of pixels with low luminance in the analysis range of the video signal is low, and determines to use the gamma curve GC3 (step S311).

After the gamma curve is determined, the processing shown in FIG. 8 is completed.

In addition, the above-described first embodiment involves the description of an example in which the determinor 340 of the display controller 30 and the determinor 520 of the display module 50 determine a gamma curve to be used for decoding or encoding by selecting one gamma curve from a plurality of gamma curves prepared in advance, but is not limited to such an example. For example, the determinor 340 and the determinor 520 may calculate a gamma curve each time decoding or encoding, and determine that the calculated gamma curve is used for decoding or encoding. In this case, the determinor 340 calculates a gamma curve to be used for encoding on the basis of the result of analysis performed by the analyzer 330. In addition, the determinor 520 calculates a gamma curve to be used for decoding on the basis of the gamma curve information acquired by the format decoder 510.

The modification example according to the first embodiment has been described above.

As described above, the display system 1 according to the first embodiment includes a decoder 310 (first decoder) that decodes an input first video signal and outputs a second video signal, an analyzer 330 that analyzes the second video signal and acquires a luminance distribution in at least a part of an analysis range of the second video signal, a determinor 340 (first determinor) that determines a first gamma curve to be used for encoding the second video signal on the basis of the luminance distribution, an encoder 350 that outputs a third video signal obtained by encoding the second video signal using the determined first gamma curve, a determinor 520 (second determinor) that determines a second gamma curve to be used for decoding the third video signal on the basis of the third video signal and gamma curve information indicating the first gamma curve used for encoding, a decoder 530 (second decoder) that outputs a fourth video signal obtained by decoding the third video signal using the determined second gamma curve, and a display 550 that displays a video on the basis of the fourth video signal.

With such a configuration, in the display system 1 according to the first embodiment, after the input video signal is decoded, the characteristics of the video signal are analyzed, the optimal gamma curve to be used for decoding is determined on the basis of the analysis result, and the video signal after image processing is encoded with the determined gamma curve and then transmitted to the display. This alleviates not only data loss during the decoding process (gamma processing) performed before image processing on the video signal, but also data loss during the encoding process (inverse gamma processing) performed on the video signal after image processing.

Thus, the display system 1 according to the first embodiment makes it possible to suppress degradation in image quality caused by the data capacity of a transmission path.

2. Second Embodiment

The first embodiment has been described above. Next, a second embodiment will be described with reference to FIGS. 10 to 14. Hereinafter, a description overlapping with the first embodiment will be appropriately omitted.

In the above-described first embodiment, an example in which one video is displayed on a display having one display has been described, but this embodiment is not limited to such an example. In a second embodiment, an embodiment in which one video is displayed on a display having a plurality of displays will be described as an example. For example, this is the case of a multi-display in which a plurality of LED displays are combined. In this case, one video is displayed on the display by dividing one video into a plurality of divided videos, each of which is displayed on a corresponding display.

2-1. Configuration of Display System

Figure 10:
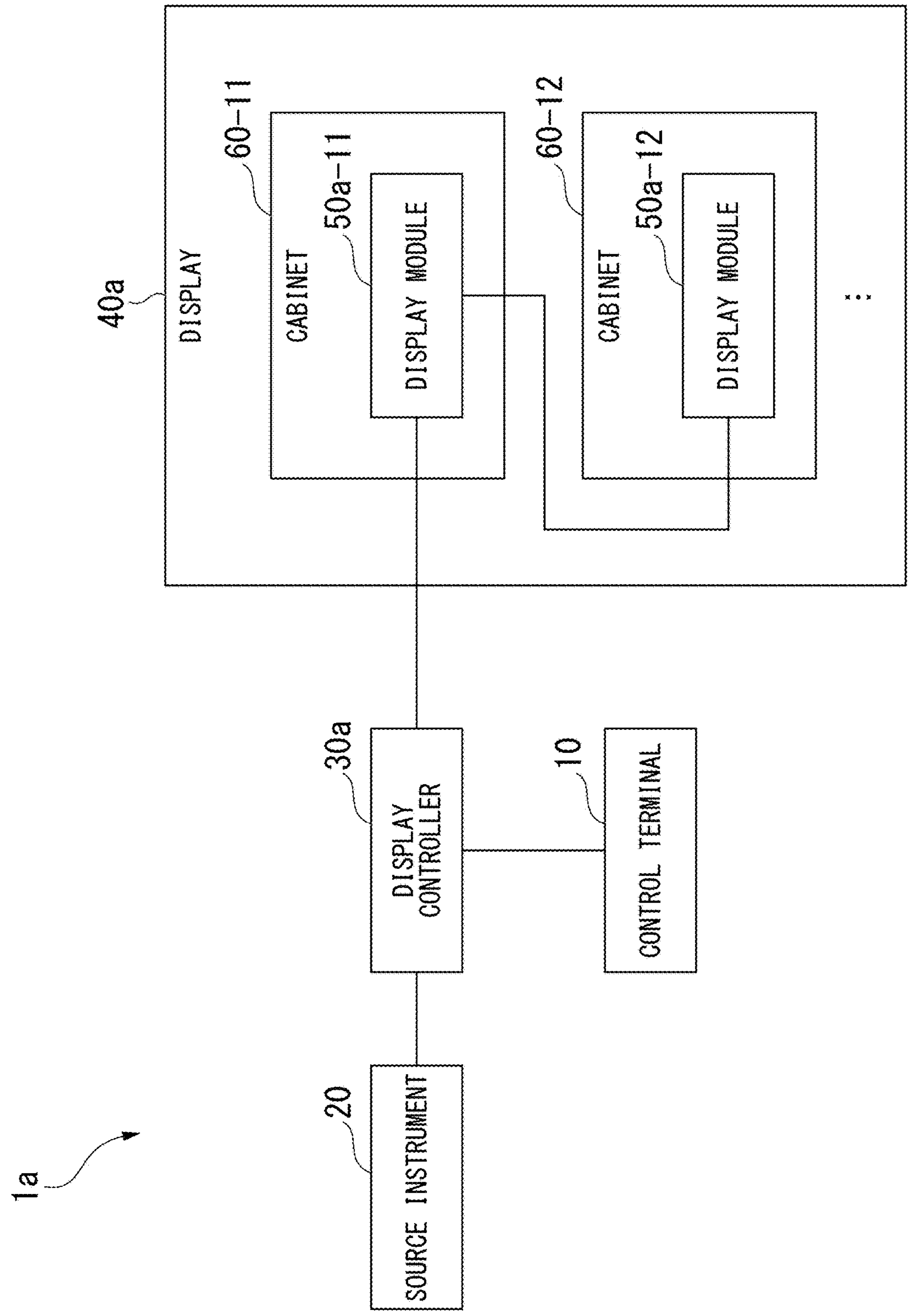
FIG. 10 A block diagram illustrating an example of a configuration of a display system according to a second embodiment.

The configuration of a display system according to a second embodiment will be described with reference to FIGS. 10 to 12. FIG. 10 is a block diagram illustrating an example of the configuration of a display system according to a second embodiment.

As shown in FIG. 10, a display system 1*a* according to the second embodiment includes a control terminal 10, a source instrument 20, a display controller 30*a*, a display 40*a*, a plurality of display modules 50*a*, and a plurality of cabinets 60.

As shown in FIG. 10, in the display system 1*a*, the display 40*a* includes the plurality of display modules 50*a* and the plurality of cabinets 60. That is, the display system 1*a* includes a plurality of displays.

The display 40*a* is realized by physically connecting the plurality of display modules 50*a*-11, 50*a*-12, . . . . Each of the plurality of display modules 50*a*-11, 50*a*-12, . . . is housed in and connected to the plurality of cabinets 60-11, 60-12, . . . .

Here, the configuration of the display 40*a* will be described with reference to FIG. 11. FIG. 11 is a diagram illustrating an example of the configuration of the display 40*a* according to the second embodiment.

Figure 11:
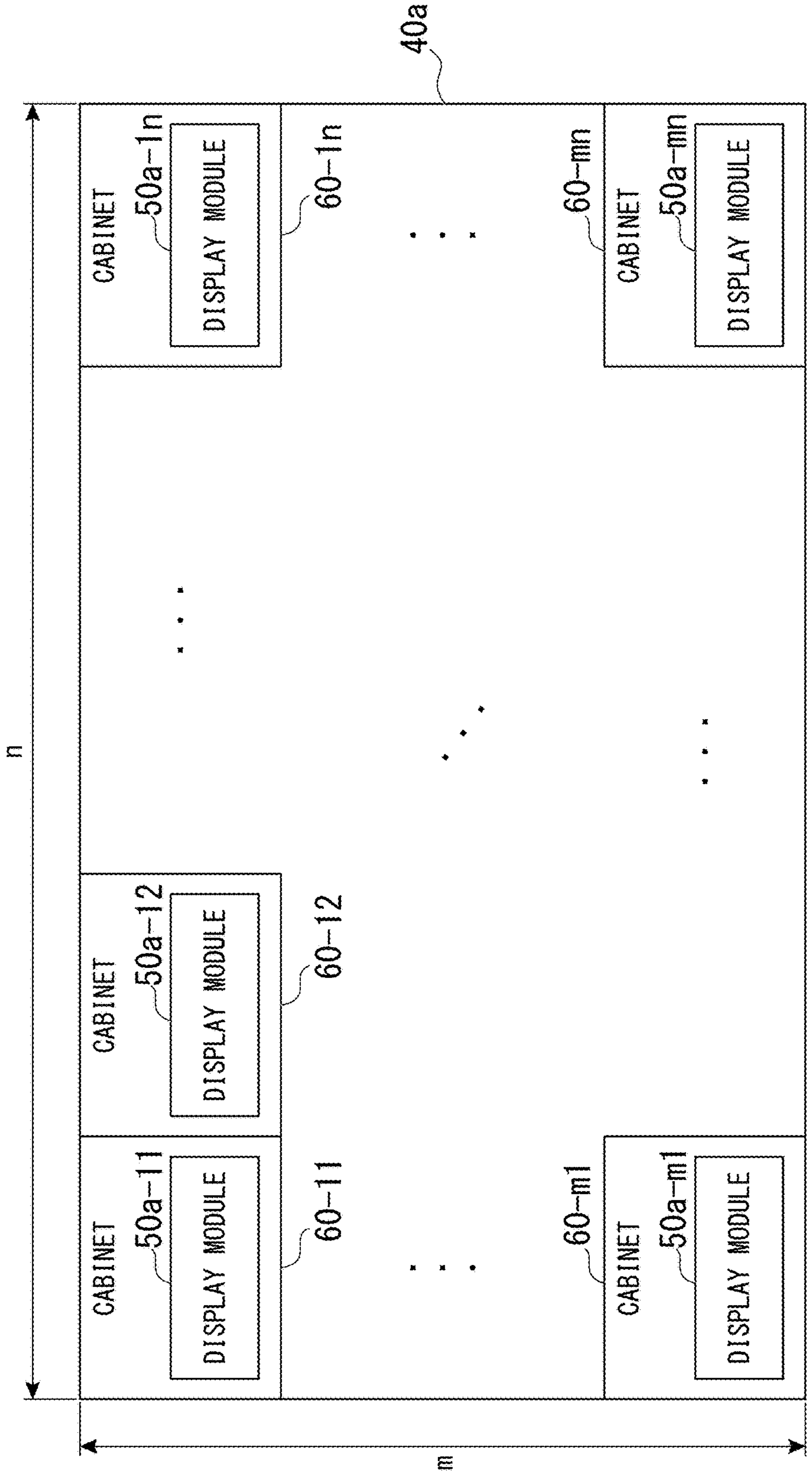
FIG. 11 A diagram illustrating an example of a configuration of a display according to the second embodiment.
Figure 12:
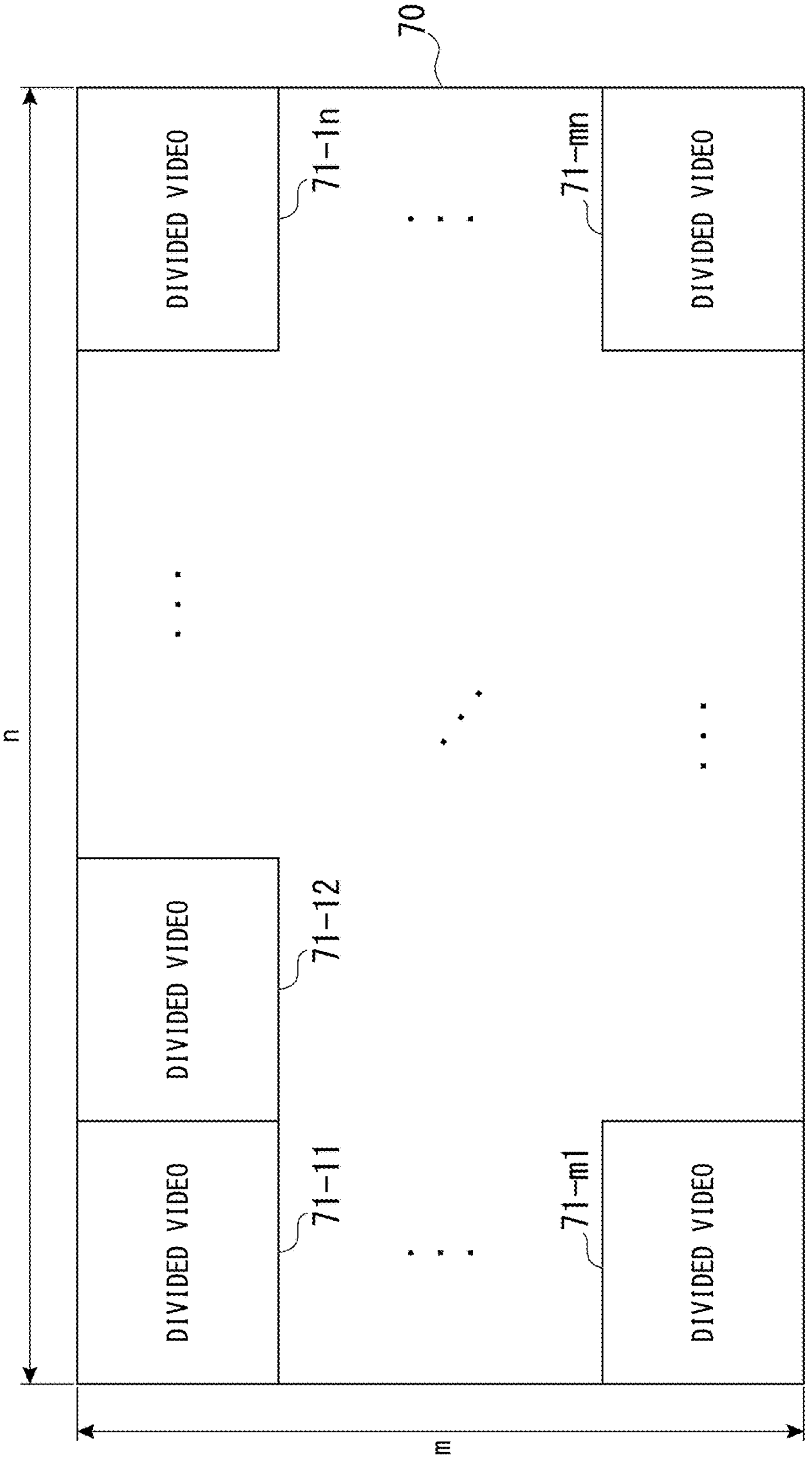
FIG. 12 A diagram illustrating an example of a video displayed on the display according to the second embodiment.

As shown in FIG. 11, in the display 40*a*, the cabinets 60 are arranged in a matrix with m cabinets vertically and n cabinets horizontally. That is, m×n cabinets 60 are arranged. The display module 50*a* is housed in each of the cabinets 60. That is, one display 40*a* is configured by arranging m×n display modules 50 in a matrix, similar to the cabinets 60.

Here, a video displayed on the display 40*a* will be described with reference to FIG. 12. FIG. 12 is a diagram illustrating an example of a video displayed on the display 40*a* according to the second embodiment.

In the second embodiment, a video displayed on the display 40*a* is divided into a plurality of divided videos in accordance with the number of displays (display modules 50*a*) included in the display 40*a*. FIG. 12 shows an example of division of the video displayed on the display 40*a* shown in FIG. 11. The display 40*a* shown in FIG. 11 is configured with m×n display modules 50, and thus has m×n displays. Therefore, a video 70 displayed on the display 40*a* shown in FIG. 11 is divided into m divided videos vertically and n divided videos horizontally as shown in FIG. 12. That is, the video 70 is divided into m×n divided videos.

Thus, the display 40*a* displays each divided video 71 on the corresponding display of the display module 50*a*. For example, the display module 50*a*-11 displays the divided video 71-11, the display module 50*a*-12 displays the divided video 71-12, the display module 50*a*-1*n* displays the divided video 71-1*n*, the display module 50*a*-*m*1 displays the divided video 71-*m*1, and the display module 50*a*-*mn* displays the divided video 71-*mn*.

2-2. Functional Configuration of Display Controller

The configuration of the display system 1*a* according to the second embodiment has been described above. Next, the functional configuration of the display controller 30*a* according to the second embodiment will be described with reference to FIG. 13. The functional configuration of the display controller 30*a* according to the second embodiment is similar to the functional configuration of the display controller 30 according to the first embodiment shown in FIG. 2, but the function of the analyzer is different.

Figure 13:
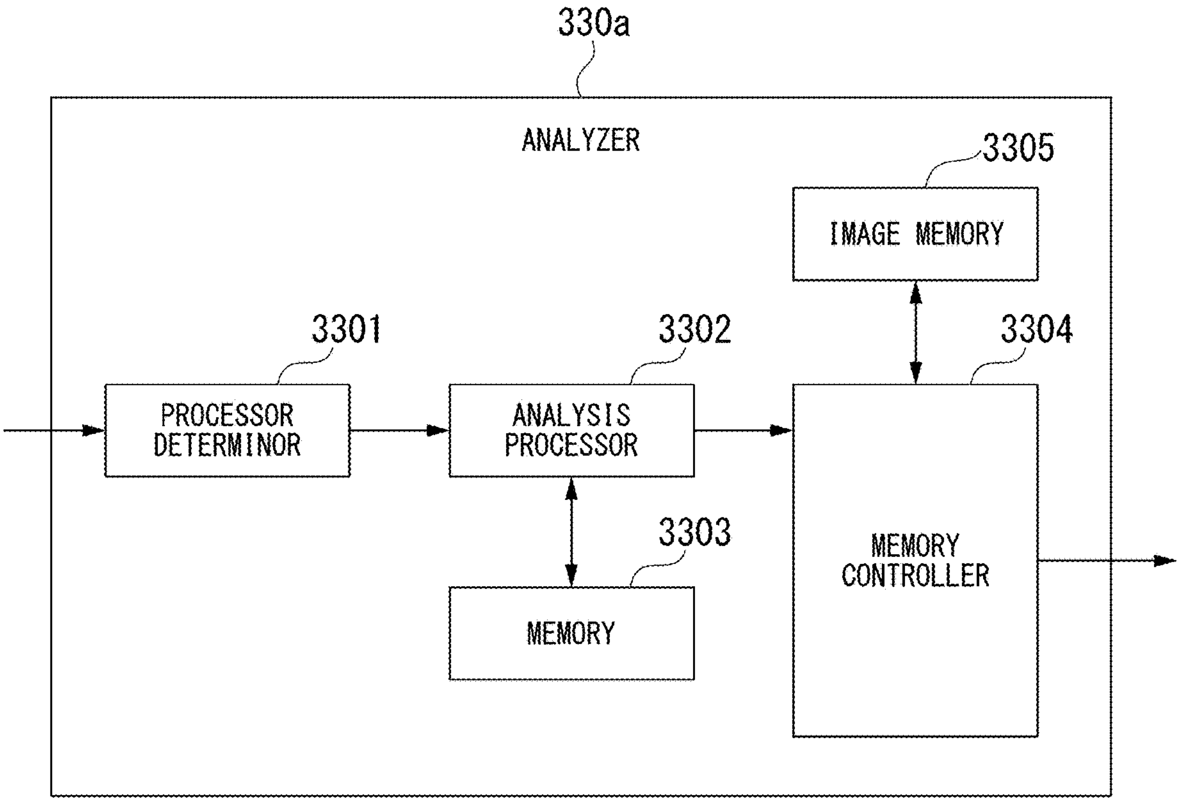
FIG. 13 A block diagram illustrating an example of a functional configuration of an analyzer according to the second embodiment.

Here, the functional configuration of the analyzer of the display controller 30*a* according to the second embodiment will be described with reference to FIG. 13. FIG. 13 is a block diagram illustrating an example of the functional configuration of the analyzer according to the second embodiment.

As shown in FIG. 13, the analyzer 330*a* according to the second embodiment includes a processor determinor 3301, an analysis processor 3302, a memory 3303, a memory controller 3304, and an image memory 3305.

(1) Processor Determinor 3301

The processor determinor 3301 has a function of determining the processor of a video signal. The processor determinor 3301 determines which video signal (second video signal) data input from the signal processor 320 corresponds to the divided video 71 to be displayed on which display module 50*a*, on the basis of a control signal such as a vertical synchronizing signal or a horizontal synchronizing signal. After the determination, the processor determinor 3301 outputs the video signal together with the determination result to the analysis processor 3302.

(2) Analysis Processor 3302

The analysis processor 3302 has a function of analyzing a video signal. The analysis processor 3302 performs analysis processing for each divided video in the same manner as the analyzer 330 according to the first embodiment. The analysis processor 3302 uses the memory 3303 in order to hold count values, generated histograms, and the like during analysis.

After the analysis, the analysis processor 3302 outputs the analyzed video signal and the acquired luminance distribution to the memory controller 3304.

(3) Memory 3303

The memory 3303 has a function of holding data generated by the analysis process of the analysis processor 3302. For example, the memory 3303 holds count values, generated histograms, and the like generated during analysis by the analysis processor 3302.

(4) Memory Controller 3304

The memory controller 3304 has a function of controlling the output of various types of information. The memory controller 3304 temporarily holds the video signal and the luminance distribution in the image memory 3305 in order to rearrange the video signal which is input from the analysis processor 3302 in the order of transmission when the video signal is transmitted from the display controller 30*a* to the display module 50*a*. Thereafter, the memory controller 3304 reads out the video signal and the luminance distribution from the image memory 3305 in the order of transmission, and outputs them to the determinor 340 in the subsequent stage.

(5) Image Memory 3305

The image memory 3305 has a function of temporarily holding a video signal which is input from the memory controller 3304. In a case where a request is made by the memory controller 3304, the image memory 3305 outputs the requested video signal.

With the above-described configuration, the analyzer 330*a* of the display controller 30*a* can analyze the video signal (second video signal) for each portion corresponding to the divided videos to acquire a plurality of luminance distributions. This makes it possible for the determinor 340 (first determinor) to determine a gamma curve (first gamma curve) to be used for encoding the video signal for each portion corresponding to the divided videos of the video signal (second video signal) on the basis of the plurality of luminance distributions.

2-3. Functional Configuration of Display Module

The functional configuration of the display controller 30*a* according to the second embodiment has been described above. Next, the functional configuration of the display module 50*a* according to the second embodiment will be described.

The display 40*a* according to the second embodiment includes the plurality of display modules 50*a*. Each of the plurality of display modules 50*a* includes the format decoder 510, the determinor 520 (second determinor), the decoder 530 (second decoder), the switcher 540, and the display 550, similar to the display module 50 according to the first embodiment shown in FIG. 4.

A video signal which is input from the display controller 30*a* to the display 40*a* side is processed by the display module 50*a* including the display 550 on which a divided video indicated by the video signal is displayed.

When a video signal is input from the display controller 30, each of the format decoders 510 acquires the video signal and gamma curve information of the divided video portion through the format decoding process, and outputs them to the determinor 520.

Each of the determinors 520 determines a gamma curve (second gamma curve) to be used for decoding a video signal (third video signal) on the basis of the video signal (third video signal) obtained by encoding a portion of the video signal (second video signal) (divided video portion) corresponding to the divided video displayed on the corresponding display 550, and the gamma curve information indicating the gamma curve (first gamma curve) used for encoding.

Each of the decoders 530 outputs a video signal (fourth video signal) obtained by decoding the video signal (third video signal) using the determined gamma curve (second gamma curve).

The switcher 540 switches which of the plurality of video signals (fourth video signals) which are output from each processor 531 of the decoder 530 is to be output to a block in the subsequent stage on the basis of the gamma curve information which is input from the determinor 520.

The display 550 displays the divided video on the basis of the video signal (fourth video signal) which is input from the switcher 540.

2-4. Flow of Processing

The functional configuration of the display module 50*a* according to the second embodiment has been described above. Next, a flow of processing according to the second embodiment will be described.

In second embodiment, the processing is performed in the same manner as the flow of processing according to the first embodiment shown in FIG. 6, but some processing is different. In the case of the second embodiment, the determination process is performed by the processor determinor 3301 before the analysis process of step S104. After the determination process, the analysis process of step S104 is performed by the analysis processor 3302. After the analysis process, a rearrangement process is performed by the memory controller 3304. After the rearrangement process, the determination process of step S105 is performed by the determinor 340.

2-5. Modification Example

The flow of processing according to the second embodiment has been described above. Next, a modification example according to the second embodiment will be described.

The above-described second embodiment involves the description of an example in which the analyzer 330*a* determines the processor and then performs the analysis process, but is not limited to such an example. For example, the video signal may be rearranged and then the analysis process may be performed. This eliminates the need for a process of determining the processor, and also eliminates the need for a configuration for this purpose.

Figure 14:
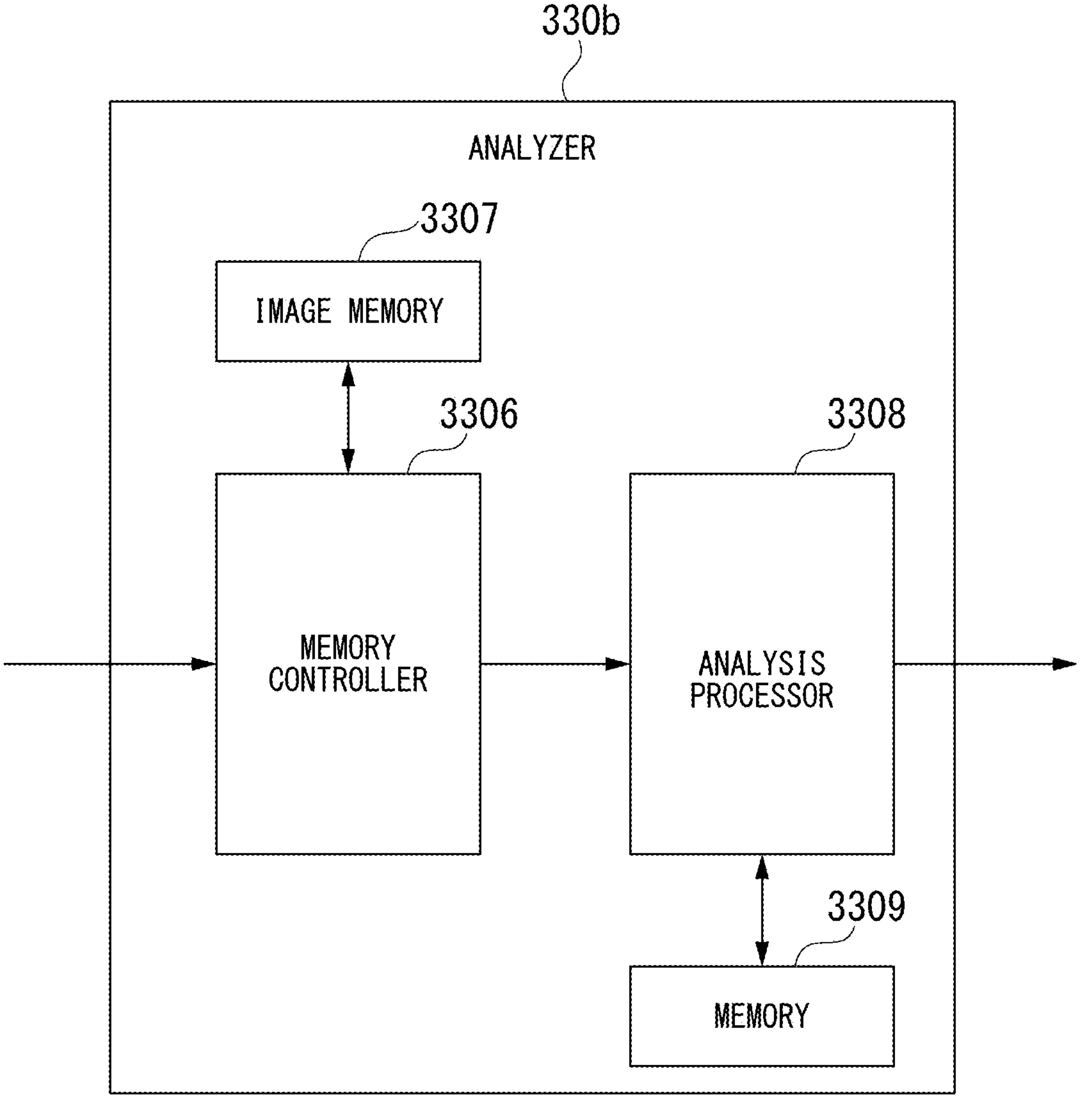
FIG. 14 A block diagram illustrating an example of a functional configuration of an analyzer in a modification example according to the second embodiment.

Here, the functional configuration of the analyzer of the display controller 30*a* in the modification example according to the second embodiment will be described with reference to FIG. 14. FIG. 14 is a block diagram illustrating an example of the functional configuration of the analyzer in the modification example according to the second embodiment.

As shown in FIG. 14, an analyzer 330*b* in the modification example according to the second embodiment includes a memory controller 3306, an image memory 3307, an analysis processor 3308, and a memory 3309.

(1) Memory Controller 3306

The memory controller 3306 rearranges the video signals which are input from the signal processor 320 in the same manner as the memory controller 3304 according to the above-described second embodiment. Meanwhile, the image memory 3307 is used to temporarily hold the video signals.

After the rearrangement, the memory controller 3306 reads out the video signals from the image memory 3307 in the order of transmission, and outputs them to the analysis processor 3308.

(2) Image Memory 3307

Similar to the image memory 3305 according to the above-described second embodiment, the image memory 3307 temporarily holds the video signal which is input from the memory controller 3306, and outputs the requested video signal in a case where a request is made by the memory controller 3306.

(3) Analysis Processor 3308

The analysis processor 3308 performs the analysis process for each divided video in the same manner as the analysis processor 3302 according to the above-described second embodiment. Meanwhile, the analysis processor 3308 uses the memory 3309 to hold count value, generated histograms, and the like during analysis.

After the analysis, the analysis processor 3308 outputs the analyzed video signal and the acquired luminance distribution to the determinor 340 in the subsequent stage.

(4) Memory 3309

The memory 3309 has a function of holding data generated by the analysis process of the analysis processor 3302. For example, the memory 3303 holds count values, generated histograms, and the like generated during analysis by the analysis processor 3302.

In the case of the modification example, before the analysis process of step S104, the rearrangement process is performed by the memory controller 3306. After the rearrangement process, the analysis process of step S104 is performed by the analysis processor 3308. After the analysis process, the determination process of step S105 is performed by the determinor 340.

3. Third Embodiment

The second embodiment has been described above. Next, a third embodiment will be described with reference to FIGS. 15 and 16. Hereinafter, descriptions overlapping with the first to second embodiments will be appropriately omitted.

The first and second embodiments described above involve an example in which the display controller 30 processes the video signal which is input from the source instrument 20 as it is, but are not limited to such an example. For example, the display controller 30 may divide the input video signal into three video signals of R (Red), G (Green), and B (Blue), and process each video signal separately.

Figure 15:
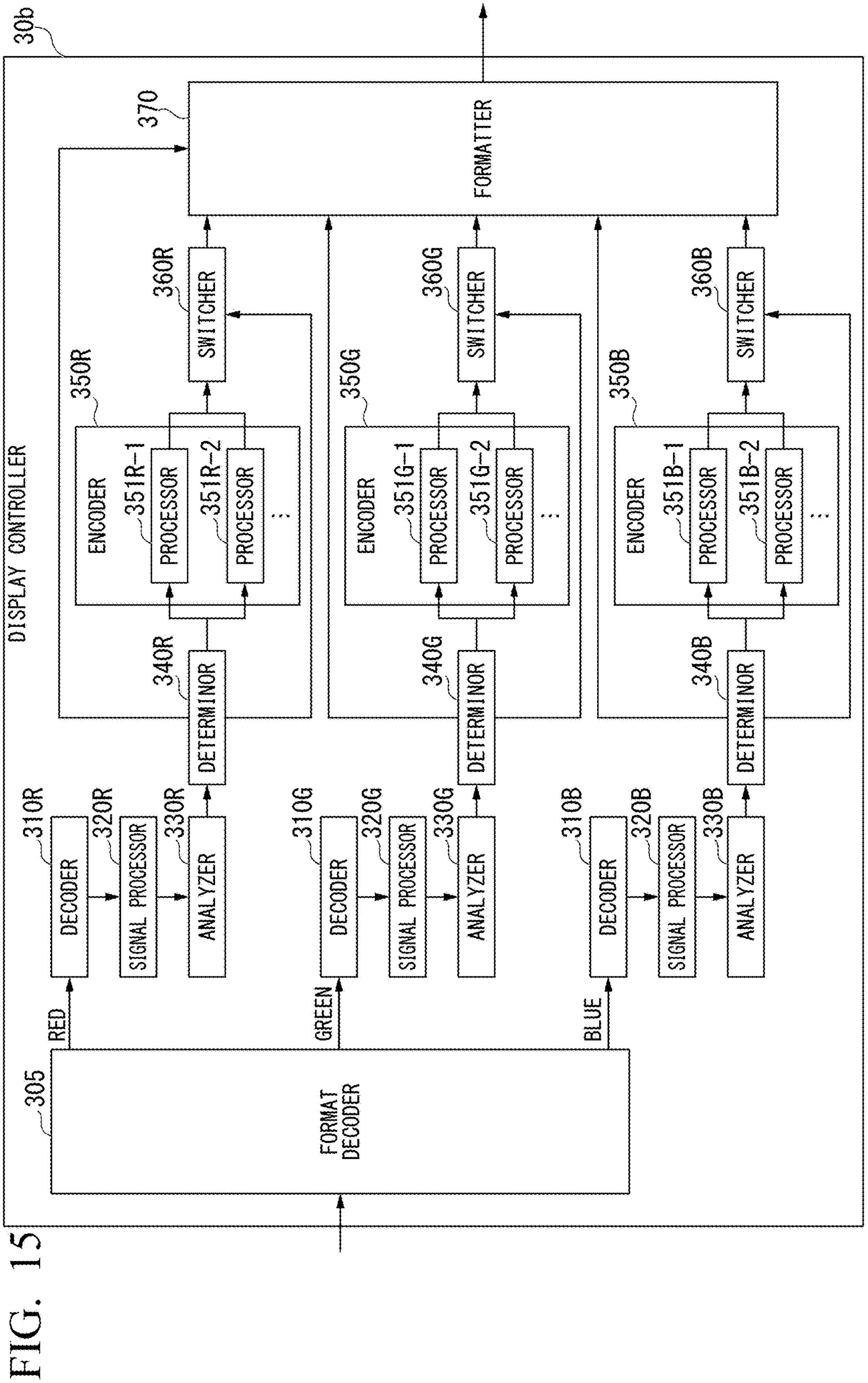
FIG. 15 A block diagram illustrating an example of a functional configuration of a display controller according to a third embodiment.

Here, the functional configuration of a display controller according to the third embodiment will be described with reference to FIG. 15. FIG. 15 is a block diagram illustrating an example of the functional configuration of a display controller according to the third embodiment.

As shown in FIG. 15, a display controller 30*b* according to the third embodiment includes a format decoder 305, the decoder 310, the signal processor 320, the analyzer 330, the determinor 340, the encoder 350, the switcher 360, and the formatter 370.

The decoder 310, the signal processor 320, the analyzer 330, the determinor 340, the encoder 350, and the switcher 360 are each provided with a processing block for an R video signal (a block marked with an R symbol), a processing block for a G video signal (a block marked with a G symbol), and a processing block for a B video signal (a block marked with a B symbol).

The format decoder 305 performs a process of dividing the video signal which is input from the source instrument 20 into an R video signal, a G video signal, and a B video signal. After the division, the format decoder 305 outputs the R video signal to a decoder 310R, the G video signal to a decoder 310G, and the B video signal to a decoder 310B. In a case where the video signal is input as YUV data, the format decoder 305 converts the YUV data into RGB data.

In the decoder 310, the signal processor 320, the analyzer 330, the determinor 340, the encoder 350, and the switcher 360 for R, G, and B video signals, each process is performed in the same manner as in the first or second embodiment described above.

The formatter 370 performs the formatting process on the video signals which are input from the switcher 360 for R, G, and B video signals, and transmits the processed video signals to a display module 50*b*.

Figure 16:
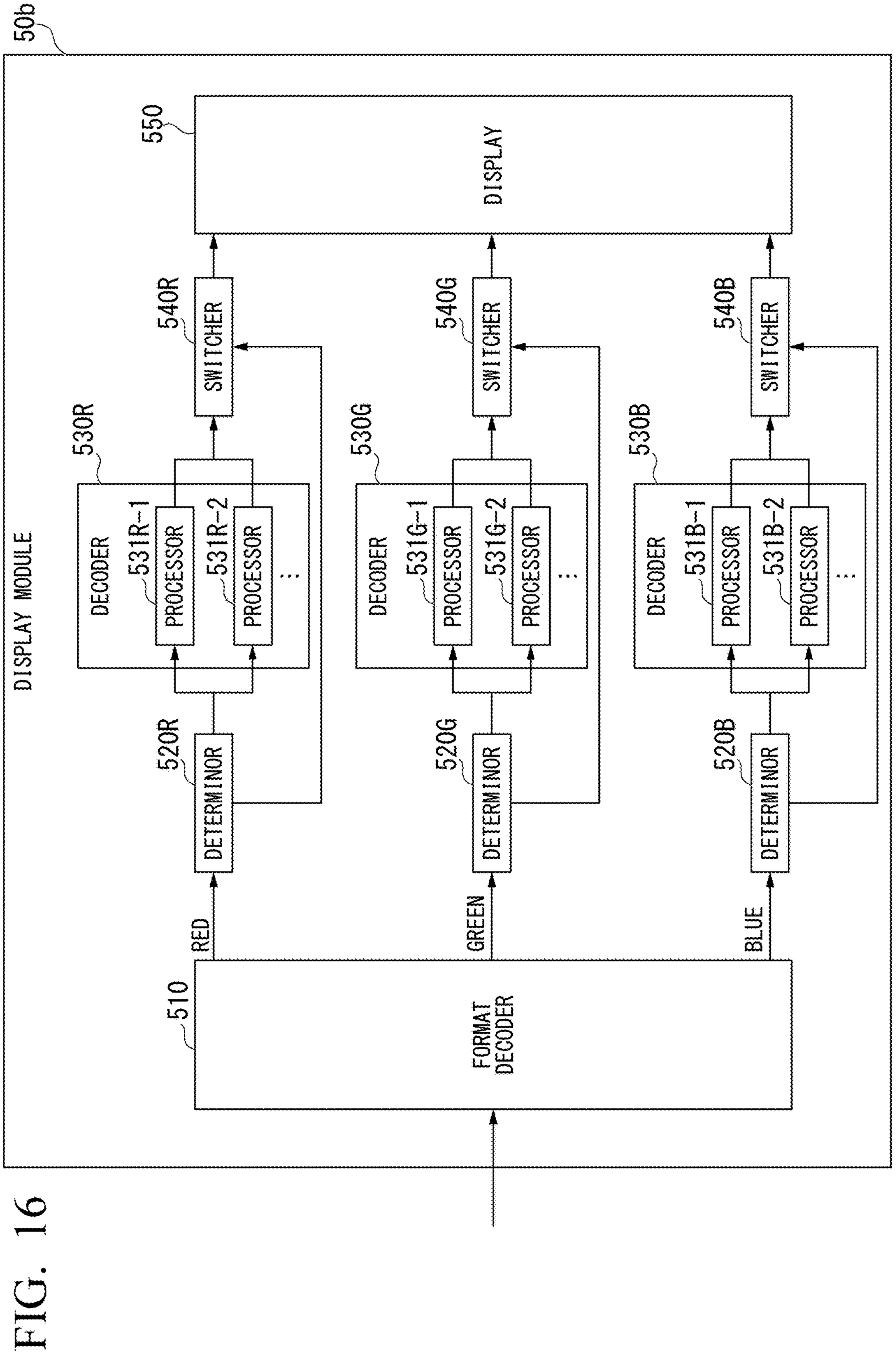
FIG. 16 A block diagram illustrating an example of a functional configuration of a display module according to the third embodiment.

Here, the functional configuration of a display module according to the third embodiment will be described with reference to FIG. 16. FIG. 16 is a block diagram illustrating an example of the functional configuration of the display module according to the third embodiment.

As shown in FIG. 16, the display module 50*b* according to the third embodiment includes the format decoder 510, the determinor 520, the decoder 530, the switcher 540, and the display 550.

The determinor 520, the decoder 530, and the switcher 540 are each provided with a processing block for an R video signal (a block marked with an R symbol), a processing block for a G video signal (a block marked with a G symbol), and a processing block for a B video signal (a block marked with a B symbol).

When a video signal is input from the display controller 30*b*, the format decoder 510 performs the format decoding process for each of the R, G, and B video signals. After the process, the format decoder 510 outputs the R video signal and the gamma curve information to the determinor 520R, the G video signal and the gamma curve information to the determinor 520G, and the B video signal and the gamma curve information to the determinor 520B.

In the determinor 520, the decoder 530, and the switcher 540 for each of the R, G, and B video signals, each process is performed in the same manner as in the first or second embodiment described above.

The display 550 displays a video on the basis of the video signal which is input from the switcher 540 for each of the R, G, and B video signals.

4. Fourth Embodiment

The third embodiment has been described above. Next, a fourth embodiment will be described with reference to FIGS. 17 to 18. Hereinafter, descriptions overlapping with the first to third embodiments will be appropriately omitted.

Each of the embodiments described above involves the description of an example in which the encoder of the display controller and the decoder of the display module each include a plurality of processors, but is not limited to such an example. For example, the encoder of the display controller and the decoder of the display module each may include only one processor.

Figure 17:
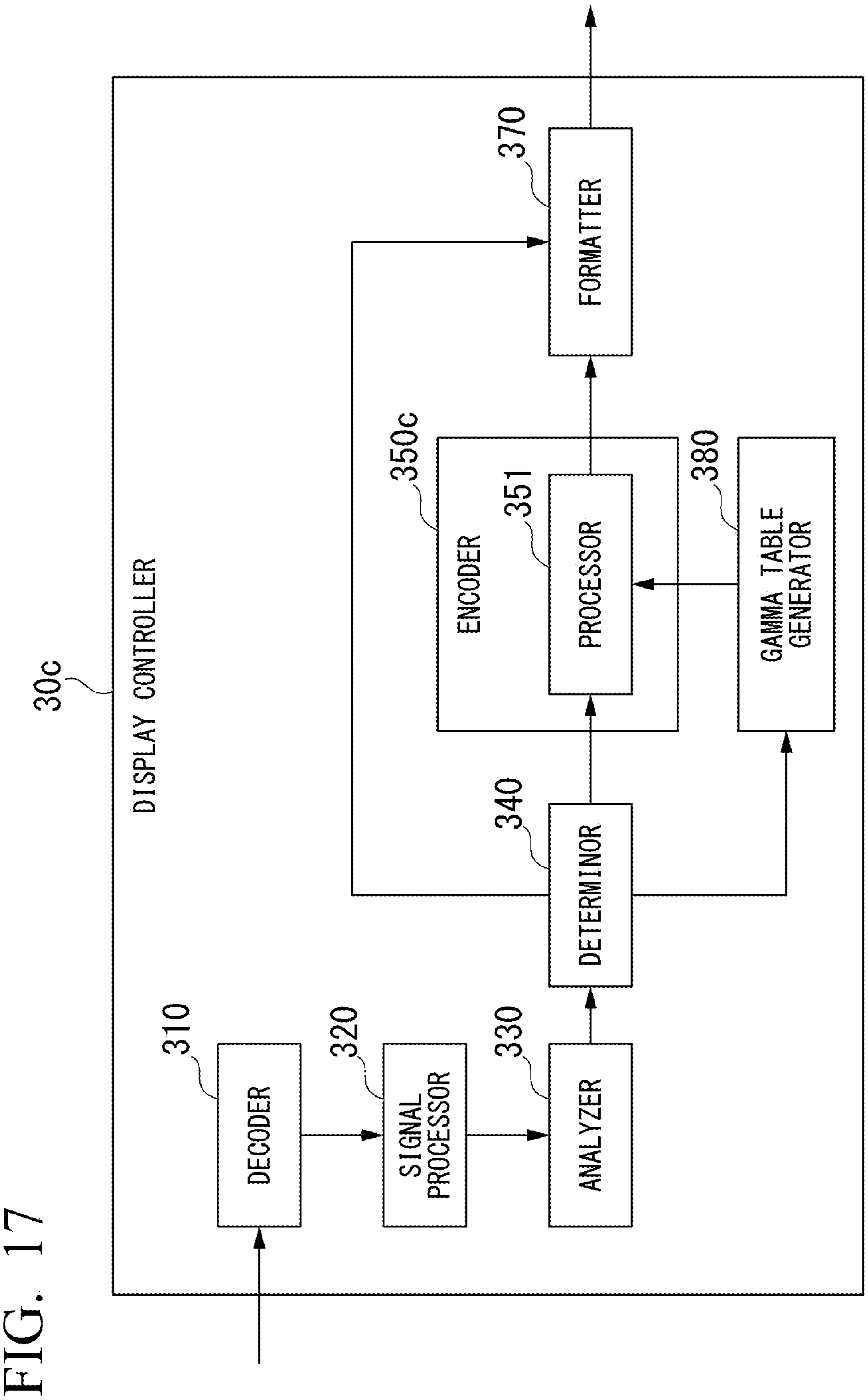
FIG. 17 A block diagram illustrating an example of a functional configuration of a display controller according to a fourth embodiment.

Here, the functional configuration of a display controller in a case where the encoder of the display controller includes only one processor will be described with reference to FIG. 17. FIG. 17 is a block diagram illustrating an example of the functional configuration of a display controller according to a fourth embodiment.

As shown in FIG. 17, a display controller 30*c* according to a fourth embodiment includes the decoder 310, the signal processor 320, the analyzer 330, the determinor 340, an encoder 350*c*, the formatter 370, and a gamma table generator 380.

After the determination process, the determinor 340 outputs a video signal to the encoder 350*c*, and outputs the gamma curve information to the formatter 370 and the gamma table generator 380.

The gamma table generator 380 generates a table (gamma table) indicating a gamma curve to be used for encoding a video signal on the basis of the gamma curve information which is input from the determinor 340.

The processor 351 of the encoder 350*c* performs encoding on the video signal which is input from the determinor 340 using the gamma curve indicated by the gamma table generated by the gamma table generator 380.

The gamma table generator 380 updates the gamma table on the basis of the gamma curve information which is input from the determinor 340 every time the gamma curve to be used for encoding is determined by the determinor 340. The processor 351 then performs encoding on the basis of the updated gamma table. The gamma table generator 380 quickly rewrites the gamma table, making it possible to execute the encoding process using a plurality of gamma curves.

Figure 18:
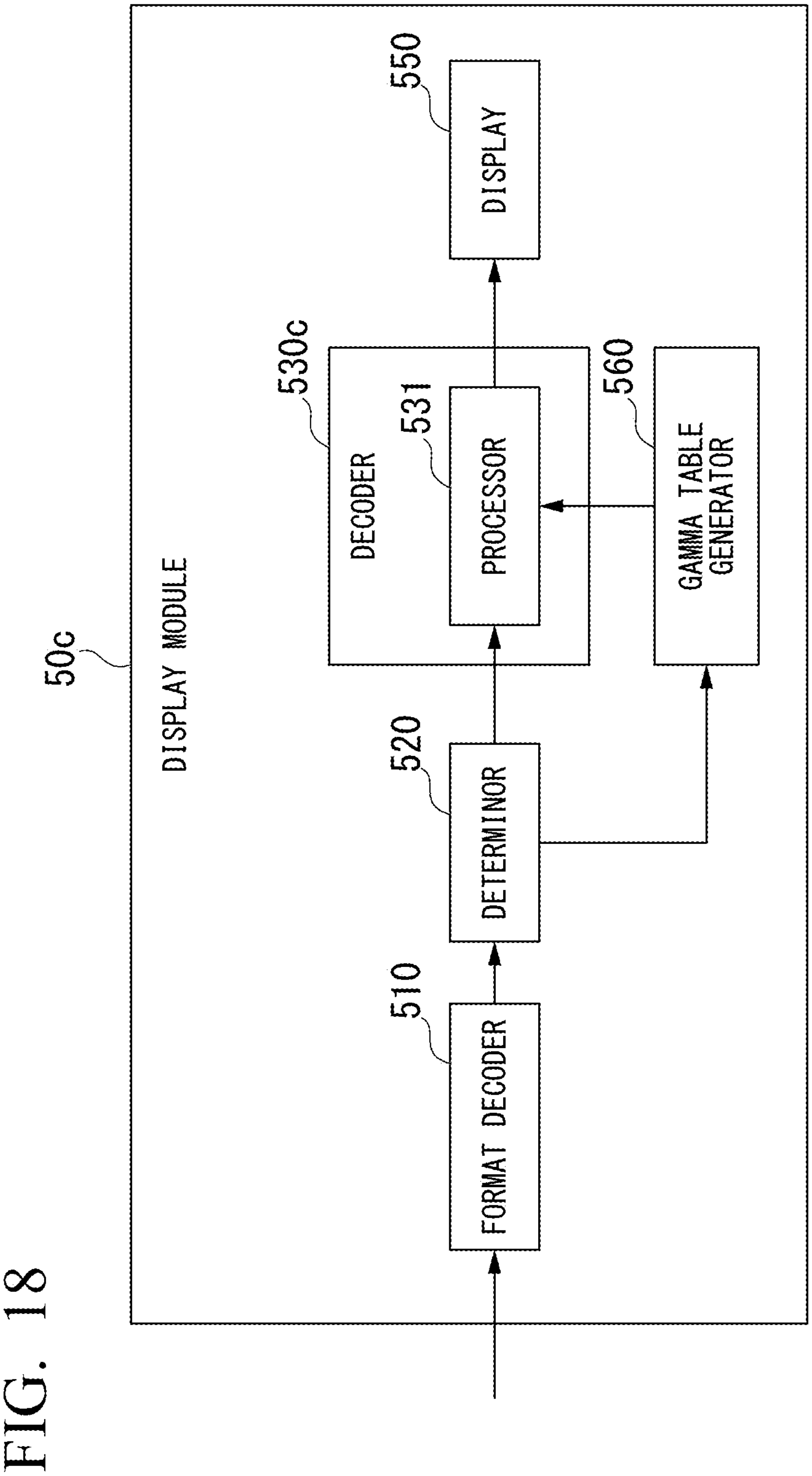
FIG. 18 A block diagram illustrating an example of a functional configuration of a display module according to the fourth embodiment.

Here, the functional configuration of a display module in a case where the decoder of the display module includes only one processor will be described with reference to FIG. 18. FIG. 18 is a block diagram illustrating an example of the functional configuration of a display module according to a fourth embodiment.

As shown in FIG. 18, a display module 50*c* according to the fourth embodiment includes the format decoder 510, the determinor 520, a decoder 530*c*, the display 550, and a gamma table generator 560.

After the determination process, the determinor 520 outputs a video signal to the decoder 530*c*, and outputs gamma curve information to the gamma table generator 560.

The gamma table generator 560 generates a table (gamma table) indicating a gamma curve to be used for decoding a video signal on the basis of the gamma curve information which is input from the determinor 520.

The processor 531 of the decoder 530*c* performs decoding on the video signal which is input from the determinor 520 using the gamma curve indicated by the gamma table generated by the gamma table generator 560.

The gamma table generator 560 updates the gamma table on the basis of the gamma curve information which is input from the determinor 520 every time the gamma curve to be used for decoding is determined by the determinor 520. The processor 531 then performs decoding on the basis of the updated gamma table. The gamma table generator 560 quickly rewrites the gamma table, making it possible to execute the decoding process using a plurality of gamma curves.

5. Fifth Embodiment

Figure 19:
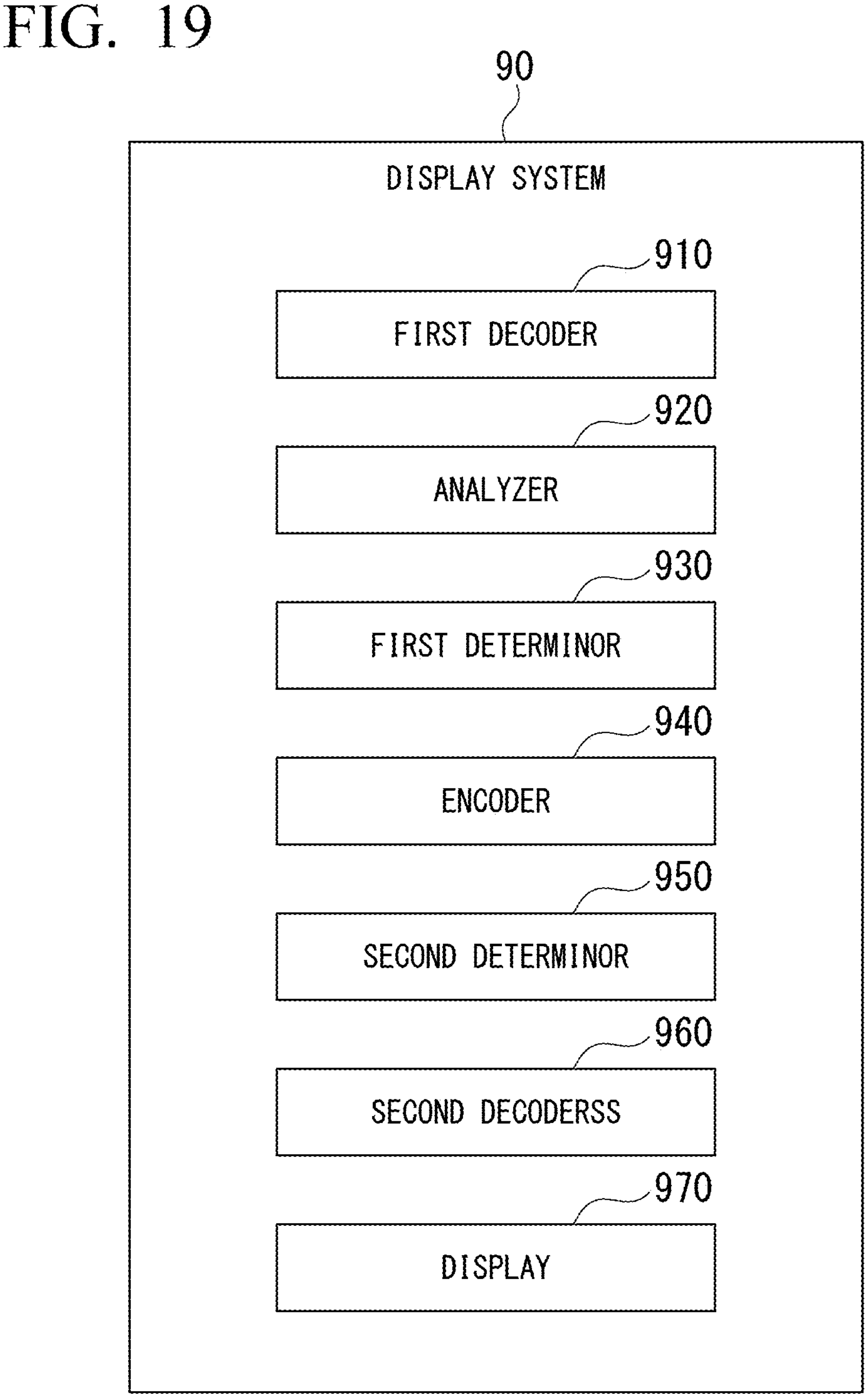
FIG. 19 A block diagram illustrating an example of a configuration of a display system according to a fifth embodiment.

The fourth embodiment has been described above. Next, a fifth embodiment will be described with reference to FIG. 19. FIG. 19 is a block diagram illustrating an example of a configuration of a display system according to a fifth embodiment.

As shown in FIG. 19, a display system 90 according to the fifth embodiment includes a first decoder 910, an analyzer 920, a first determinor 930, an encoder 940, a second determinor 950, a second encoder 960, and a display 970.

The first decoder 910 decodes the input first video signal and outputs a second video signal.

The analyzer 920 analyzes the second video signal and acquires a luminance distribution in at least a part of an analysis range of the second video signal.

The first determinor 930 determines a first gamma curve to be used for encoding the second video signal on the basis of the luminance distribution.

The encoder 940 outputs a third video signal obtained by encoding the second video signal using the determined first gamma curve.

The second determinor 950 determines a second gamma curve to be used for decoding the third video signal on the basis of the third video signal and gamma curve information indicating the first gamma curve used for encoding.

The second encoder 960 outputs a fourth video signal obtained by decoding the third video signal using the determined second gamma curve.

The display 970 displays a video on the basis of the fourth video signal.

With such a configuration, in the display system 90 according to the fifth embodiment, after the input video signal is decoded, the characteristics of the video signal are analyzed, the optimal gamma curve to be used for decoding is determined on the basis of the analysis result, and the video signal after image processing is encoded with the determined gamma curve and then transmitted to the display. This alleviates not only data loss during the decoding process (gamma processing) performed before image processing on the video signal, but also data loss during the encoding process (inverse gamma processing) performed on the video signal after image processing.

Thus, the display system 90 according to the fifth embodiment makes it possible to suppress degradation in image quality caused by the data capacity of a transmission path.

Each embodiment of the present invention has been described above. Meanwhile, all or some of the functions of the display system, the control terminal, the source instrument, the display controller, the display, and the display module in each of the above-described embodiments may be realized by a computer. In that case, these functions may be realized by recording a program for realizing the functions in a computer-readable recording medium, and causing a computer system to read and execute the program recorded in this recording medium. Meanwhile, the term "computer system" referred to here is assumed to include an OS and hardware such as peripheral devices. In addition, the term "computer-readable recording medium" refers to a portable medium such as a flexible disk, a magneto-optic disc, a ROM, or a CD-ROM, and a storage device such as a hard disk built into the computer system. Further, the "computer readable recording medium" may include recording mediums that dynamically hold a program during a short period of time like networks such as the Internet or communication lines when a program is transmitted through communication lines such as a telephone line, and recording mediums that hold a program for a certain period of time like a volatile memory inside a computer system serving as a server or a client in that case. In addition, the above program may be a program which is used for realizing a portion of the aforementioned functions, may be a program which is capable of realizing the aforementioned functions by a combination of programs previously recorded in the computer system, and may be a program which is realized using a programmable logic device such as a field programmable gate array (FPGA).

Hereinbefore, although the embodiments of this invention have been described in detail with reference to the accompanying drawings, specific configurations are not limited to those described above, and various design changes and the like can be made without departing from the scope of this invention.

REFERENCE SIGNS LIST

1, 1*a*, 90 Display system
10 Control terminal
20 Source instrument
30, 30*a*, 30*b*, 30*c* Display controller
40, 40*a* Display
50, 50*a*, 50*b*, 50*c* Display module
60 Cabinet
305 Format decoder
310, 310B, 310G, 310R Decoder
320 Signal processor
330, 330*a*, 330*b* Analyzer
340 Determinor
350, 350*c* Encoder
351 Processor
360 Switcher
370 Formatter
380 Gamma table generator
510 Format decoder
520, 520B, 520G, 520R Determinor
530, 530*c* Decoder
531 Processor
540 Switcher
550 Display
560 Gamma table generator
910 First decoder
920 Analyzer
930 First determinor
940 Encoder
950 Second determinor
960 Second encoder

970 Display
3301 Processor determinor
3302 Analysis processor
3303 Memory
3304 Memory controller
3305 Image memory
3306 Memory controller
3307 Image memory
3308 Analysis processor
3309 Memory

The invention claimed is:

1. A display system comprising:

a first decoder that decodes an input first video signal and outputs a second video signal;

an analyzer that analyzes the second video signal and acquires a luminance distribution in at least a part of an analysis range of the second video signal;

a first determinor that determines a first gamma curve to be used for encoding the second video signal on the basis of the luminance distribution;

an encoder that outputs a third video signal obtained by encoding the second video signal using the determined first gamma curve;

a second determinor that determines a second gamma curve to be used for decoding the third video signal on the basis of the third video signal and gamma curve information indicating the first gamma curve used for encoding;

a second decoder that outputs a fourth video signal obtained by decoding the third video signal using the determined second gamma curve; and a display that displays a video on the basis of the fourth video signal.

2. The display system according to claim 1, wherein the first determinor determines the first gamma curve to be used for encoding the second video signal in accordance with a proportion of pixels with low luminance in the analysis range from the luminance distribution.

3. The display system according to claim 2, wherein in a case where the proportion of pixels with low luminance in the analysis range is high, the first determinor determines to use the first gamma curve in which a gamma value is set to be smaller than in a case where a proportion of pixels with luminance other than low luminance in the analysis range is high.

4. The display system according to claim 1, wherein the display system includes a plurality of the displays, and in a case where one video is displayed by displaying each of a plurality of divided videos obtained by dividing one video on the corresponding display, the analyzer analyzes the second video signal for each portion corresponding to the divided videos and acquires a plurality of the luminance distributions, and the first determinor determines the first gamma curve to be used for encoding the second video signal for each portion corresponding to the divided videos of the second video signal on the basis of the plurality of luminance distributions.

5. The display system according to claim 4, wherein the display system includes the second determinor and the second decoder for each of the plurality of displays, each of the second determinors determines a second gamma curve to be used for decoding the third video signal on the basis of the third video signal obtained by encoding a portion of the second video signal corresponding to the divided video displayed on the corresponding display, and gamma curve information indicating the first gamma curve used for encoding, and each of the second decoders outputs a fourth video signal obtained by decoding the third video signal using the determined second gamma curve.

6. The display system according to claim 1, wherein, based on a first gamma value set in the first gamma curve indicated by the gamma curve information, the second determinor determines to use a second gamma curve in which a second gamma value that is a reciprocal of the first gamma value is set.

7. The display system according to claim 1, further comprising:

a signal processor that performs signal processing on the second video signal which is input from the first decoder and outputs the second video signal that has undergone the signal processing to the analyzer.

8. A display method executed by a computer, the method comprising:

a first decoding step of decoding an input first video signal and outputting a second video signal;

an analysis step of analyzing the second video signal and acquiring a luminance distribution in at least a part of an analysis range of the second video signal;

a first determination step of determining a first gamma curve to be used for encoding the second video signal on the basis of the luminance distribution;

an encoding step of outputting a third video signal obtained by encoding the second video signal using the determined first gamma curve;

a second determination step of determining a second gamma curve to be used for decoding the third video signal on the basis of the third video signal and gamma curve information indicating the first gamma curve used for encoding;

a second decoding step of outputting a fourth video signal obtained by decoding the third video signal using the determined second gamma curve; and a display step of displaying a video on the basis of the fourth video signal.

* * * * *